United States Patent
Takagi et al.

(10) Patent No.: US 7,538,050 B2
(45) Date of Patent: May 26, 2009

(54) GLASS COMPOSITION

(75) Inventors: Masataka Takagi, Otsu (JP); Noriyuki Yoshida, Otsu (JP); Hachiro Takahashi, Otsu (JP); Shigeaki Aoki, Otsu (JP); Mitsuo Kato, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 657 days.

(21) Appl. No.: 10/503,546

(22) PCT Filed: Feb. 5, 2002

(86) PCT No.: PCT/JP03/01185

§ 371 (c)(1),
(2), (4) Date: Mar. 28, 2005

(87) PCT Pub. No.: WO03/066539

PCT Pub. Date: Aug. 14, 2003

(65) Prior Publication Data

US 2005/0209083 A1 Sep. 22, 2005

(30) Foreign Application Priority Data

Feb. 5, 2002 (JP) .............................. 2002-028134

(51) Int. Cl.
C03C 6/00 (2006.01)
C03C 3/23 (2006.01)
C03C 3/112 (2006.01)
C03B 5/00 (2006.01)
C03B 5/16 (2006.01)

(52) U.S. Cl. .............................. 501/27; 501/43; 501/57; 501/69

(58) Field of Classification Search ................... 501/53, 501/27, 55–79; 65/32.5, 134.1, 134.3, 134.5, 65/134.9

See application file for complete search history.

(56) References Cited

U.S. PATENT DOCUMENTS

| 2,038,627 A | 4/1936 | Badger |
| 2,386,685 A | 10/1945 | Hood |
| 3,109,045 A | 10/1963 | Silverman |
| 3,622,296 A * | 11/1971 | Buehl ........................ 65/32.5 |
| 5,173,212 A * | 12/1992 | Speit et al. ............ 252/301.4 P |
| 5,318,931 A * | 6/1994 | Nakaguchi et al. ............ 501/64 |
| 5,922,097 A * | 7/1999 | Kobayashi et al. ......... 65/134.1 |
| 6,319,867 B1 * | 11/2001 | Chacon et al. ................ 501/66 |
| 6,358,869 B1 * | 3/2002 | Yamada et al. ................. 501/4 |

FOREIGN PATENT DOCUMENTS

| EP | 0915062 | 5/1999 |
| EP | 1184343 | 3/2002 |
| GB | 1449215 | 9/1976 |

OTHER PUBLICATIONS

Article Titled "Hand book of gas diffusion in solids and melts" 1996, ASM International, Materials Park, Ohio, USA.

* cited by examiner

*Primary Examiner*—Karl E Group
*Assistant Examiner*—Noah S Wiese
(74) *Attorney, Agent, or Firm*—J.C. Patents

(57) ABSTRACT

A glass composition of the present invention is manufactured by melting glass raw materials and contains a multicomponent oxide as a main component, and the glass composition contains at least one of helium and neon in an amount of 0.01 to 2 μL/g (0° C. 1 atm).

12 Claims, No Drawings

GLASS COMPOSITION

BACKGROUND OF THE INVENTION

The present invention relates to a glass composition, and more specifically to a glass composition capable of reducing bubbles in a glass product by decreasing a dissolved gas in a glass and capable of improving homogeneity of the glass product.

The most important object among objects addressed over many years in manufacture of a glass product is to manufacture a very homogeneous glass by completely removing bubbles remaining in the glass which lead to defects in the glass product. Various inventions have been made to attain the object, but a method is not yet discovered which satisfies the prerequisite of stable manufacture and supply of a high quality glass demanded by the industrial world and consumers at low cost and which is easy for glass manufacturers to implement.

Further, a method of manufacturing a glass product from a solid such as a method employing a gas phase reaction and a sol-gel method is recognized. However, in general, the most often employed industrial method of manufacturing a large amount of a glass product involves: using a mixture of inorganic compounds as a main raw material for glass raw materials; and melting the raw materials at high temperatures, to manufacture a glass product. According to the manufacturing method employing melting, methods of removing bubbles from a molten glass are roughly classified into a chemical method and a physical method. A typical example of the former method is a method of adding fining agents into glass raw materials, and a typical example of the latter method is a method of reducing pressure or vacuum degassing the molten glass.

In particular, while a wide variety of glass products are supplied recently, the former method generally involves: adding a minute amount of fining agents into the glass raw materials; heating the glass raw materials at high temperatures for foaming in a molten glass through their decomposition or redox reaction; and removing a carbon dioxide gas generated during melting, bubbles remaining in the raw materials, nitrogen generated during glass melting. The method is characterized in that, although attention must be focused on control of glass melting temperature and of molten glass flow and on segregation of fining agents in the glass raw materials, the method enables continuous mass production of a glass product with relative ease if a fining agent providing a stable fining effect can be selected. There exist many cases where such a fining method suitable for mass production of glass has been employed during melting.

Among those, the most frequently employed method involves adding arsenic, which provides a sufficient fining effect with minute addition, as oxide in the glass. However, environmental problems have been pointed out regarding addition of arsenic. Thus, an urgent need of selecting another fining agent for replacing arsenic or for reducing the amount of arsenic added as a fining agent has resulted in reexamination of other hitherto proposed fining agents, developments of new fining compounds, or the like. Among those, many substances such as antimony, chlorine, and niter have been studied as substitute for arsenic, but a fining agent having a fining effect surpassing that of arsenic is far from found, particularly for an oxide glass requiring high temperature melting. Thus, melting furnace conditions have been studied for aiding the fining effect of the fining agent replacing arsenic, and many attempts have been made on various measures for solving the problems such as combination of a plurality of fining agents and increase of furnace temperature. However, despite such continuous studies and attempts, a low-cost method applicable to various glass compositions and assuredly providing a stable and good fining effect is not yet found.

On the other hand, examples of the physical method include: reduction of glass viscosity by increasing a melting temperature; a centrifugal method; flow control of molten glass inside the furnace; a stirring method; a gas blowing method; a sonic/ultrasonic method; an reduced pressure method; control of a melting atmosphere; and a combination thereof. Several inventions have been reported regarding a method of forcibly accelerating a rise of bubbles in the glass to the surface by keeping the molten glass under reduced pressure, for example. Patent Document 1 and Patent Document 2 below each describe a reduced pressure defoaming apparatus arranged between a melting tank and a working tank of a glass melting furnace. However, such methods are not yet widely used as a general method of homogenizing a glass because the methods are not as easy as the chemical method to implement, do not provide comparable results as those of the chemical method, require a very large capital investment, and limit a usable glass composition.

Various gases are employed for a melting atmosphere in a part of a glass manufacturing process. Among those, Patent Document 3 below describes a method involving remelting a glass in an inert gas atmosphere as a means for preventing reboiling. Further, Patent Document 4 below describes use of a hydrogen gas or a helium gas during a densing process of a quarts glass tube base material. Further, Patent Document 5 below describes reduction of a water content in a glass by bubbling a gas selected from the group consisting of $CO_2$, $N_2$, $O_2$, $NO_x$, and a noble gas as a dry gas.

Further, Patent Document 6 below describes that a supplemental effect can be realized during fining of a molten glass by using helium with sodium chloride, and that the effect was confirmed upon using helium with a very small, experimental amount of the molten glass.

Patent Document 1: JP 11-130442 A (p. 2-7, FIGS. 1-2)
Patent Document 2: JP 11-130444 A (P. 2-7, FIG. 1)
Patent Document 3: JP 06-329422 A (p. 2-4)
Patent Document 4: JP 09-301726 A (p. 2-4, FIG. 1)
Patent Document 5: JP 07-172862 A (p. 2-8, FIGS. 1-7)
Patent Document 6: U.S. Pat. No. 3,622,296

Defoaming of a molten glass under reduced pressure as in Patent Document 1 and Patent Document 2 may be recognized as one measure, but such a method requires large-scale remodeling of a manufacturing facility and may require introduction of an expensive devices, thereby being disadvantageous to attain a reduced cost price for manufacture of a glass product requiring mass production.

Further, adoption of the inert gas for the melting atmosphere as in Patent Document 3 and Patent Document 4 has been realized for specific glass compositions. However, the method is for shielding the molten glass from oxygen and for adjusting the water content. Neither Patent Document 3 nor Patent Document 4 describes an inert gas content in the glass or a fining action during glass melting.

On the other hand, a fining method in Patent Document 6 had focused on the helium gas for the first time, and was an innovative fining method for the molten glass. However, the method was regarded supplemental to specific glass compositions, and assumes nothing on quantitative criteria of helium usage for broader applications, applications to glass materials of other grades, or the like. Thus, no follower of the method appeared, resulting in no application of the method to a widely used multicomponent oxide glass and no new improvements.

SUMMARY OF THE INVENTION

An object of the present invention is to provide a novel glass composition capable of fundamentally solving problems in fining of a multicomponent oxide glass during melting.

The inventors of the present invention have found, through studies on conventional fining of a multicomponent oxide glass during melting, an optimum glass composition applicable to various uses by including helium and/or neon in a wide variety of multicomponent oxide glass products manufactured by high temperature melting.

That is, a glass composition according to the present invention relates to a glass composition manufactured by melting glass raw materials and containing a plurality of oxides as main components, characterized by including at least one of helium and neon in an amount of 0.01 to 2 µL (micro liters)/g (0° C., 1 atm).

The inventors of the present invention have found that bubbles in the molten glass can be removed completely or can be drastically reduced, thus providing a good fining effect, by including as a component providing a fining effect to the molten multicomponent oxide glass, a predetermined amount of helium or neon as an inert gas component.

Each element in the molten glass is generally in a network state having a weak bonding force, and higher temperatures cause vigorous, irregular element position changes involving stretching vibration, rotation vibration, and bending vibration at a relatively high speed. However, as described below, helium and neon have very low reactivities and are small because an electron arrangement of each atomic structure has a closed shell structure. Thus, helium or neon hardly bonds with various elements constituting a molten glass, and are sufficiently small to pass through openings of a vibrating network. Therefore helium or neon can easily diffuse through the molten glass without being affected by surrounding elements.

Thus, when the molten glass is brought into contact with a helium and/or neon gas to dissolve helium and/or neon in the molten glass, the gas of helium or neon follows the Henry's law and rapidly diffuses to a predetermined partial pressure in the molten glass. On the other hand, oxygen, carbon dioxide, water vapor, sulfurdioxide, halogen, or the like in the molten glass have a smaller diffusion rate than that of helium or neon, and do not permeate through the molten glass at the same rate as the diffusion rate of helium or neon into the molten glass. Thus, the total partial pressure in the molten glass increases.

Oxygen, carbon dioxide, steam, sulfur dioxide, halogen, or the like generates through a chemical reaction or the like of the glass raw materials. An absence of a fining agent results in the total partial pressure in the molten glass exceeding an external pressure, that is, exceeding 1 atm in the atmosphere through the diffusion of helium or neon. Helium and neon function as follows under such high pressure conditions. That is, an amount of a gas such as oxygen, carbon dioxide, and water vapor dissolved in the molten glass is represented as a partial pressure in the molten glass. When the total partial pressure exceeds the external pressure of 1 atm, the gas such as oxygen, carbon dioxide, water vapor, sulfur dioxide, and halogen hardly remains stably dissolved in the glass, and diffuses into fine bubbles present in the surroundings. As a result, bubble sizes expand in the molten glass and the bubbles increase in rising rate and disappear at a glass surface, to thereby remove fine bubbles in the molten glass.

Further, when the molten glass contains a fining agent added to raw materials, an amount of an oxygen gas in the molten glass, that is, an oxygen partial pressure remains at equilibrium with redox reaction of a fining agent. As described above, the oxygen gas at equilibrium diffuses into fine bubbles by dissolution of helium or neon in the molten glass, and a partial pressure of oxygen equilibrium with the fining agent established in the molten glass is ruined. Thus, the reduction of fining agent is promoted, to supply oxygen gas in the molten glass. As a result, dissolution of helium or neon in the molten glass enables efficient supply of oxygen gas from the fining agent in the molten glass, which is the most effective fining gas in oxide glasses.

As described above, two steps involved in the dissolution of helium or neon in the molten glass can assuredly realize further promotion of decomposition of a fining agent added as a raw material in the molten glass during homogenization of the molten glass having a composition of the present invention maintained at high temperatures. That is, the two steps involve: 1) increasing the total pressure of gases to realize a high pressure state necessary for discharge of gases from the molten glass; and 2) forming bubbles as a gas phase from a dissolved gas phase with high pressure such as oxygen, or promoting bubble expansion, in the molten glass.

Both helium and neon used in the present invention may be classified as inert gases and noble gases, and have stable closed shell structures to exist as monoatomic molecules. Helium is the lightest element among the noble gas elements, and is also very small structurally. Helium has a very small attracting force by the Van der Waals force, and thus, helium does not solidify and remains liquid even at the absolute temperature of zero under normal atmospheric pressure. Further, neon is the second smallest element next to helium among the noble gas elements and has a stable structure as a monoatomic molecule. Thus, both helium and neon are captured in voids of a glass network structure that consists of inorganic oxides in the glass product cooled after high temperature melting.

Helium or neon is not involved in network structure formation of the glass, but inclusion thereof alone or in total in an amount of 0.01 µL/g or more in the glass provides a fining effect to the molten glass and provides a homogeneous glass. A content of less than 0.01 µL/g cannot provide a sufficient fining effect. For an assured fining effect, a content is preferably 0.06 µL/g or more. A content is more preferably 0.1 µL/g or more. Such a content can realize a sufficient clarifying effect even under harsh conditions including a large content of gasifying components in the glass. On the other hand, a content exceeding 2 µL/g is not preferable because so-called reboiling, that is, re-foaming occurs through reheating of the glass composition. A preferable upper limit of the content is 1.5 µL/g (1.5 µL/g or less) for inhibiting reboiling, though varying depending on the glass composition, heating conditions, or the like. The preferable upper limit of the content is 1.0 µL/g (1.0 µL/g or less) for a glass composition in which a fining agent except helium or neon coexists, because reboiling tends to occur more easily.

Thus, a preferable range of a helium and/or neon content is 0.1 µL/g to 1.5 µL/g in the molten glass, in which no fining agent except helium or neon coexists, for providing a fining agent effect under harsher conditions and for inhibiting reboiling. On the other hand, a preferable range of the helium and/or neon content in the molten glass, in which a fining agent except helium or neon coexists, is 0.1 µL/g to 1.0 µL/g, for providing a fining effect under harsher conditions and for inhibiting reboiling.

Further, a glass formation path includes formation from a gas chase through vaporization or formation from a solid phase through a sol-gel method, but the present invention is intended for a glass formed by retaining the glass raw materials at high temperatures and cooling the molten glass. Energy for melting glass raw materials may be provided through: burning of a solid, liquid, or gas fuel; electromagnetic radiation such as electricity and infrared radiation; and radiation heat or conductive heat from other high temperature media.

A glass composition of the present invention is manufactured by melting glass raw materials. That is, the glass raw materials are precursors before melting and are substances which vitrify as so-called an super cooled liquid by heating to high temperatures once and then cooling. The glass raw materials solidify into a glass composition of a product containing a plurality of oxides as main components. The glass raw materials are not limited as long as a glass phase coexists in the glass composition even if a crystal phase forms on a surface and inside thereof by the presence of the surface, an interface, or the like depending on the cooling procedures and cooling conditions employed.

That is, examples of the glass raw materials that can be used in the present invention include materials containing: a single substance, a mixture, or a compound of inorganic substances such as oxides, carbonates, phosphates, chlorides, and various glass as a main component; and a single substance, a mixture, or a compound of organic additives, metal additives, or the like as an additive, if required. As represented by a classification of the glass based on source of the glass raw materials, any substance such as natural products, synthetic products, or purified products may be used as long as it provides necessary components for a glass composition that contains a plurality of oxides as main components. Further, highly purified industrial products, with impurities in a ppm order or a ppb order removed through various methods, can be employed as glass raw materials of the present invention. Further, generally used raw materials for glass manufacture, manufactured and purified in mining and chemical industries, may also be used as raw materials for the glass composition of the present invention.

The phrase "glass composition containing a plurality of oxides as main components" as used in the present invention refers to a glass composition containing two or more types of oxides and containing 50 mass % or more of the two or more types of oxides in total. The "glass composition containing a plurality of oxides as main components" of the present invention does not apply to a glass composition having a single composition with a plurality of oxide components mixed as impurities, for example. To be specific, the "glass composition containing a plurality of oxides as main components" of the present invention does not apply to a glass composition containing close to 99% in mass % of a single component and 0.09 mass % or less, that is, two decimal places, of the plurality of oxide components respectively, for example.

Further, melting of the glass raw materials generally involves: collectively holding the glass raw materials in a vessel; and then melting the materials while preventing the plurality of raw materials from separating during high-temperature heating. A method which may also be employed as appropriate involves: applying an external force such as gas flow pressure and electromagnetic force; and floating to melt. Further, a medium having a function of holding the raw materials and maintaining them at high temperatures can be used for melting the glass raw materials even if the medium does not serve as a vessel. Thus, the medium does not have to be necessarily a solid, and may be a liquid such as liquid metal containing a single or a plurality of components.

While a vessel hardly reacting with the glass raw materials during melting is preferably selected when using a vessel for melting, any material, whether it is a metal or inorganic substance, may be used as a material constituting the vessel for applications where some amount of impurities may be allowed to be mixed in the glass composition. Further, when a vessel is used for capturing glass raw materials in aerospace or in a space simulating aerospace where no gravity acts, and if wettability between the vessel and the glass is too high, the glass flows over a vessel wall to the outside. Thus, wettability also must be considered. Industrial materials generally used in glass industries and exhibiting heat resistance as a main property, so-called refractories, can be employed alone or in a mixture for the vessel.

Further, examples of methods of adding helium or neon to the glass composition of the present invention include: a method involving retaining glass raw materials in a helium or neon atmosphere before melting and gradually increasing temperature in the same atmosphere while maintaining this state, for melting the glass raw materials; and a method involving sufficiently melting glass raw materials and then bringing the molten glass into contact with helium or neon, for diffusing helium or neon in the molten glass. Alternatively, use of raw materials or glass cullet having high helium or neon concentration for a specific raw material species in the glass raw materials enables effective addition of helium or neon into the glass composition.

Further, a method of diffusing helium or neon in the molten glass by adjusting an atmosphere surrounding the glass to a helium or neon atmosphere is an easy method of adding helium or neon. Other methods thereof include: a method of bubbling helium or neon in the molten glass using a refractory nozzle; and a method of employing as a material constituting a vessel, a refractory material having pores allowing diffusion of helium or neon, and generating many fine helium or neon bubbles from a bottom of the vessel, for efficient diffusion. Further, a porous refractory tip of a refractory nozzle immersed in the vessel can provide low cost and efficient diffusion of helium or neon.

Further, a glass composition of the present invention may contain a fining component in an amount of 0.001 to 3 mass %, in addition to the above composition (composition described in claim 1).

According to the present invention, a fining agent may include: a substance which has a high vapor pressure during high temperature heating, heat decomposing, and melting of the glass raw materials, which gasifies and separates from the molten glass, and which partially contains a melting atmosphere gas captured in the raw materials during melting of glass raw materials. The fining agent generally refers to a chemical substance serving to form a homogeneous molten glass by releasing a gas mixture perceived as bubbles in the molten glass. Specific examples of a gas forming bubbles in the molten glass include $CO_2$, $SO_2$, $O_2$, $N_2$, $H_2O$, $H_2$, Ar, and a mixture gas thereof. At high temperatures, an evaporated or vaporized substance from the molten glass may be included in a minute amount as a gas component.

Examples of various compounds, elements, and mixtures that can be used as the fining agent include: arsenic compounds such as $As_2O_3$; antimony compounds such as $Sb_2O_3$, $2MgO.Sb_2O_5$, $7MgO.Sb_2O_5$, $2ZnO.Sb_2O_5$, $7ZnO.Sb_2O_5$, $3CaO.Sb_2O_5$, $6CaO.Sb_2O_5$, $2SrO.Sb_2O_5$, $6SrO.Sb_2O_5$, $BaO.Sb_2O_5$, $4BaO.Sb_2O_5$, $Li_2O.Sb_2O_5$, $2Li_2O.Sb_2O_5$, $K_2O.Sb_2O_5$, $LaSbO_4$, $SbNbO_5$, $Sr(Ca_{0.33}Sb_{0.67})O_3$, $LiZnSbO_4$, $Li_{1.5}Ti_{1.0}Sb_{0.5}O_4$, $Ba_2Al_{0.5}Sb_{0.5}O_6$, $Ba_2Ce_{0.75}SbO_6$, $ZrSbPO_7$, $Ba(Sb_{0.5}Sn_{0.5})O_3$, $LiSiSbO_5$, and $Li_2Zr_2Sb_2SiO_{11}$; oxides such as $SnO_2$, $CeO_2$, and $BaO_2$; peroxides; nitrates such as $NaNO_3$, $KNO_3$, and $Ba(NO_3)_2$; sulfates such as $Na_2SO_4$, $K_2SO_4$, $CaSO_4$, and $BaSO_4$; chlorides such as NaCl, KCl, and $CaCl_2$; fluorides such as $CaF_2$, $Na_2SiF_6$, $LiF \cdot KF \cdot Al_2O_3 \cdot 3SiO_2$, and KF metal and inorganic elements such as Al, Si, Zn, Ga, Fe, Sn, and C; $H_2O$; $Al(OH)_3$; and organic compounds that are carbon-containing compounds such as sucrose, granulated sugar, cornstarch, and wood powder.

A fining component content, though varying depending on type thereof and the glass composition used, is preferably 0.001 mass % or more for providing a fining effect to the molten glass in coexistence with helium or neon. Further, the fining component content is more preferably 0.01 mass % or more for a significant fining effect. Further, for a glass composition hardly diffusing helium or neon, the fining component content is preferably 0.03 mass % or more. On the other hand, a fining component content exceeding 3 mass % poses problems of excessive gas generation and difficulty of removal of the bubbles from the molten glass. An upper limit of the fining component content is preferably 2.5 mass % for a glass product under harsh conditions for inhibiting foaming during reheat treatment, and more preferably 2.0 mass % for a glass composition applied to a glass product used under harsher conditions. Thus, a preferable fining component content ranges from 0.01 to 2.5 mass %, and optionally 0.01 to 2 mass %, 0.03 to 2.5 mass %, 0.03 to 2 mass %, 0.01 to 3 mass %, and 0.03 to 3 mass %.

Further, an addition method for the fining component is not particularly limited, and the fining component may be added as a melting raw material component or may be added to the molten glass. The fining component can be added simultaneously with the addition of helium or neon. Further, the fining component can be added to the glass intentionally as an elution component eluting from a vessel and a refractory material immersed in the molten glass. The fining component can be added alternatively with helium or neon. The addition amount of the fining component can be adjusted to an optimum amount by gradually increasing or decreasing the addition amount while the fining effect is confirmed.

A helium and/or neon content is preferably 0.1 to 1.0 μL/g when helium and/or neon is coexistent with the fining component.

Further, a glass composition of the present invention may contain as a fining component one or more components selected from the group consisting of $SO_3$, Cl, $H_2O$, Sn, Sb, F, and As, in addition to the above composition (composition described in claim 1).

$SO_3$, Cl, $H_2O$, Sn, Sb, F, or As as defined herein as a fining component exhibits a good fining effect among the various fining agents when coexisting with helium and/or neon, and is a component which partially remains in a cooled glass component even after modification through heat decomposition by high temperature melting and through a redox reaction.

Further, a glass composition according to the present invention may contain Sb in an amount of 0.01 to 1.5 mass % as $Sb_2O_3$, in addition to the above composition (composition described in claim 1).

Sb (antimony) is a component serving as a fining agent in the glass composition, and exhibits a good fining effect when coexisting with helium and/or neon. However, an $Sb_2O_3$ content of less than 0.01 mass % in the glass composition cannot provide a sufficient effect. Thus, the $Sb_2O_3$ content must be 0.01 mass % or more. The $Sb_2O_3$ content is preferably 0.1 mass % or more for a better effect. On the other hand, the $Sb_2O_3$ content must be 1.5 mass % or less because an $Sb_2O_3$ content exceeding 1.5 mass % poses a problem of reboiling by heat treatment during fabrication. Further, the $Sb_2O_3$ content is preferably 1.0 mass % or less, particularly if high temperature heat treatment is employed during fabrication, because stability against reboiling further increases with the $Sb_2O_3$ content of 1.0 mass % or less. The $Sb_2O_3$ content is preferably 0.7 mass % or less when another gas component possibly causing reboiling coexists.

Further, a glass composition according to the present invention may contain $SO_3$ in an amount of 0.001 to 1.0 mass %, in addition to the above composition (composition described in claim 1).

$SO_3$ is a component serving as a fining agent in the glass composition, and provides an enhanced fining effect for bubbles in the molten glass when coexisting with helium and/or neon. However, an $SO_3$ content of less than 0.001 mass % in the glass composition cannot provide a sufficient fining effect. Thus, the $SO_3$ content must be 0.001 mass % or more. The $SO_3$ content is preferably 0.01 mass % or more for realizing a better effect. The $SO_3$ content is preferably 0.03 mass % or more for realizing a sufficient fining effect under harsh conditions. On the other hand, the $SO_3$ content must be 1.0 mass % or less because an $SO_3$ content exceeding 1.0 mass % poses a problem of easy generation of bubbles through reboiling by reheat treatment during fabrication after cooling. A safer $SO_3$ content, though varying depending on reheat treatment conditions, is 0.8 mass % or less. The $SO_3$ content is preferably 0.5 mass % or less when another gas component possibly causing reboiling coexists.

Further, a glass composition according to the present invention may contain Cl in an amount of 0.01 to 1.5 mass %, in addition to the above composition (composition described in claim 1).

Cl (chlorine) is a component which exhibits a fining effect of promoting vaporization of a gas component from the molten glass when coexisting with helium and/or neon. However, a Cl content of less than 0.01 mass % in the glass composition cannot provide a sufficient fining effect. Thus, the Cl content must be 0.01 mass % or more. The Cl content is preferably 0.03 mass % or more for realizing a better fining effect. On the other hand, the Cl content must be 1.5 mass % or less because a Cl content exceeding 1.5 mass % poses a problem of readily impairing chemical resistance of the glass and provides a glass composition without practically sufficient resistance. An upper limit of the Cl content is preferably 1.2 mass % for a glass composition requiring higher chemical resistance and weatherability. The upper limit of the Cl content is preferably 1.0 mass % when another component deteriorating the chemical resistance and weatherability coexists.

Further, the following facts have been found about F which is a halogen gas like Cl. F has an effect of promoting vaporization of a gas component from the molten glass and of reducing a glass viscosity during melting when coexisting with helium and/or neon, and thus, inclusion of a predetermined amount of F in the glass composition is effective for attaining the intended effect of the present invention. In that case, an F content preferably ranges from 0.01 to 2.0 mass %. The F content of less than 0.01 mass % cannot provide a sufficient effect. The F content is preferably 0.03 mass % or more for realizing a better effect. On the other hand, the F content preferably does not exceed 2.0 mass % in the glass composition because F deteriorates the chemical resistance of the glass similarly to Cl by bonding with cation components in the glass to break a glass network structure in a cooled glass. An upper limit of the F content is preferably 1.5 mass % for a glass composition requiring higher chemical resistance. The upper limit of the F content is preferably 1.0 mass % when another component deteriorating the chemical resistance coexists.

Further, a glass composition according to the present invention may contain $H_2O$ in an amount of 0.01 to 0.2 mass %, in addition to the above composition (composition described in claim 1).

$H_2O$ is an effective component since it exhibits an effect of reducing a glass viscosity and of promoting discharge of a gas component from the molten glass when coexisting with helium and/or neon. However, an $H_2O$ content of less than 0.01 mass % in the glass composition cannot provide a sufficient effect. Thus, the $H_2O$ content is preferably 0.01 mass % or more. The $H_2O$ content must be 0.03 mass % or more for a better gas component vaporization effect. On the other hand, the $H_2O$ content preferably does not exceed 0.2 mass % in the glass composition because $H_2O$ deteriorates the chemical resistance and weatherability of the glass by bonding with other cations in the glass to break a glass network structure in a cooled glass. Further, the $H_2O$ content is preferably 0.15 mass % or less when another component deteriorating the chemical resistance and weatherability coexists. Further, the $H_2O$ content is preferably 0.10 mass % or less for a glass product requiring, particularly, the chemical resistance and weatherability.

Further, a glass composition according to the present invention may contain Sn in an amount of 5 mass ppm (that is, $5\times10^{-4}$ mass %) to 2 mass % as $SnO_2$, in addition to the above composition (composition described in claim 1).

Sn (tin) is a component serving as a fining agent in the glass composition, and exhibits a good fining effect when coexisting with helium and/or neon. However, an $SnO_2$ content of less than 5 mass ppm in the glass composition cannot provide a sufficient effect. Thus, the $SnO_2$ content must be 5 mass ppm or more. The $SnO_2$ content is preferably 100 mass ppm or more for exhibiting an assured effect with a small helium and/or neon content in the glass composition. The $SnO_2$ content is preferably 0.05 mass % or more, that is, 500 mass ppm or more, for a better effect with a glass composition requiring high temperature melting. On the other hand, the $SnO_2$ content is preferably 2 mass % or less because an $SnO_2$ content exceeding 2 mass % poses a problem of reboiling by heating in applications requiring heat treatment during fabrication. Further, the $SnO_2$ content is preferably 1.5 mass % or less for enhancing stability against reboiling, and is preferably 1.2 mass % or less, if high temperature heat treatment is employed during fabrication. The $SnO_2$ content is preferably 0.7 mass % or less when another reboil gas component coexists.

Further, a glass composition according to the present invention may contain As in an amount of 0.01 to 1.5 mass % as $As_2O_3$, in addition to the above composition (composition described in claim 1).

As (arsenic) is a component serving as a fining agent in the glass composition as Sb, and exhibits a good fining effect when coexisting with helium and/or neon. However, an $As_2O_3$ content of less than 0.01 mass % in the glass composition cannot provide a sufficient effect. Thus, the $As_2O_3$ content must be 0.01 mass % or more for a better effect. On the other hand, the $As_2O_3$ content must be 1.5 mass % or less because an $As_2O_3$ content exceeding 1.5 mass % poses a problem of reboiling by heat treatment during fabrication. Further, the $As_2O_3$ content is preferably 1.0 mass % or less, particularly if high temperature heat treatment is employed during fabrication, because stability against reboiling further increases with the $As_2O_3$ content of 1.0 mass % or less. The $As_2O_3$ content is preferably 0.7 mass % or less when another reboil gas component coexists.

Further, a glass composition according to the present invention may contain Sb in an amount of 0.01 to 1.5 mass % as $Sb_2O_3$ and Sn in an amount of 5 mass ppm to 2 mass % as $SnO_2$, in addition to the above composition (composition described in claim 1).

Sb and Sn here respectively have the above-described effects separately, and a glass composition containing both elements may exhibit even better effects. When Sb and Sn coexist, an $Sb_2O_3$ content of less than 0.01 mass % as Sb cannot provide a sufficient effect. Thus, the $Sb_2O_3$ content must be 0.01 mass % or more. The $Sb_2O_3$ content is preferably 0.08 mass % or more for a better effect. On the other hand, the $Sb_2O_3$ content must be 1.5 mass % or less because an $Sb_2O_3$ content exceeding 1.5 mass % poses a problem of reboiling by heat treatment during fabrication. Further, the $Sb_2O_3$ content is preferably 0.8 mass % or less, particularly if high temperature heat treatment is employed during fabrication, because stability against reboiling further increases with the $Sb_2O_3$ content of 0.9 mass % or less. The $Sb_2O_3$ content is preferably 0.6 mass % or less when another gas component possibly causing reboiling coexists.

An $SnO_2$ content of less than 5 mass ppm as Sn cannot provide a sufficient effect. Thus, the $SnO_2$ content must be 5 mass ppm or more. The $SnO_2$ content is preferably 80 mass ppm or more for exhibiting an assured effect with a small helium and/or neon content in the glass composition. The $SnO_2$ content is preferably 0.04 mass % or more, that is, 400 mass ppm or more for better effects with a glass composition requiring high temperature melting. On the other hand, the $SnO_2$ content must be 2 mass % or less because an $SnO_2$ content exceeding 2 mass % poses a problem of reboiling by heating in applications requiring heat treatment during fabrication. Further, the $SnO_2$ content is preferably 1.4 mass % or less for enhancing stability against reboiling, and is preferably 1.1 mass % or less, if high temperature heat treatment is employed during fabrication. The SnO2 content is preferably 0.6 mass % or less when another reboil gas component coexists.

Further, a glass composition according to the present invention may contain $SO_3$ in an amount of 0.001 to 1.0 mass % and Cl in an amount of 0.01 to 1.5 mass %, in addition to the above composition (composition described in claim 1).

$SO_3$ and Cl here respectively have the above-described effects separately, and a glass composition containing both elements can exhibit even better effects compared to that containing a single element. The combination of $SO_3$ and Cl is effective in melting of a glass composition having a high viscosity, which is hardly fined. However, an $SO_3$ content of less than 0.001 mass % in the glass composition cannot provide a sufficient effect. Thus, the $SO_3$ content must be 0.001 mass % or more, preferably 0. 005 mass % or more. The $SO_3$ content is preferably 0.01 mass % or more for realizing deaeration under harsher conditions. On the other hand, the $SO_3$ content is preferably 1.0 mass % or less because an $SO_3$ content exceeding 1.0 mass % poses a problem of easy generation of bubbles through reboiling by reheat treatment during fabrication after cooling. An upper limit of a safer $SO_3$ content, though varying depending on reheat treatment conditions, is 0.7 mass %. The $SO_3$ content is preferably 0.4 mass % or less when another gas component possibly causing reboiling coexists.

A Cl content of less than 0.01 mass % in the glass composition cannot provide a sufficient fining effect, when $SO_3$ and Cl coexist. Thus, the Cl content must be 0.01 mass % or more. The Cl content is preferably more than 0.02 mass % for realizing a better clarifying effect. On the other hand, an upper limit of the Cl content must be 1.5 mass % because a Cl content exceeding 1.5 mass % poses a problem of readily impairing chemical resistance of the glass and provides a glass composition without practically sufficient resistance. The upper limit of the Cl content is preferably 1.1 mass % for a glass composition used in applications requiring higher chemical resistance and weatherability. The upper limit of the Cl content is preferably 0.9 mass % when another component deteriorating the chemical resistance and weatherability coexists.

Further, a glass composition according to the present invention may contain Sb in an amount of 0.01 to 1.5 mass % as $Sb_2O_3$ and As in an amount of 0.01 to 1.5 mass % as $As_2O_3$, in addition to the above composition (composition described in claim 1).

Sb and As here respectively have the above-described effects separately, and a glass composition containing both elements can exhibit better effects in a broader temperature range compared to that containing a single element because of different decomposition temperatures of oxides. However, an $Sb_2O_3$ content of less than 0.01 mass % in the glass composition cannot provide a sufficient effect. Thus, the $Sb_2O_3$ content must be 0.01 mass % or more. The $Sb_2O_3$ content is preferably 0.07 mass % or more for a better effect. On the other hand, the $Sb_2O_3$ content is preferably 1.5 mass % or less because an $Sb_2O_3$ content exceeding 1.5 mass % poses a problem of reboiling by heat treatment during fabrication. Further, the $Sb_2O_3$ content is preferably 0.9 mass % or less, particularly if high temperature heat treatment is employed during fabrication, because stability against reboiling further increases with the $Sb_2O_3$ content of 0.9 mass % or less. The $Sb_2O_3$ content is preferably 0.7 mass % or less when another gas component possibly causing reboiling coexists.

An $As_2O_3$ content of less than 0.01 mass % as As in the glass composition cannot provide a sufficient effect, when $Sb_2O_3$ and $As_2O_{03}$ coexist. Thus, the $As_2O_3$ content must be 0.01 mass % or more. The $As_2O_3$ content is preferably 0.02 mass % or more for realizing a better effect. On the other hand, the $As_2O_3$ content must be 1.5 mass % or less because an $As_2O_3$ content exceeding 1.5 mass % poses a problem of reboiling by heat treatment during fabrication. Further, the $As_2O_3$ content is preferably 0.9 mass % or less, particularly if high temperature heat treatment is employed during fabrication, because stability against reboiling further increases with the $As_2O_3$ content of 0.9 mass % or less. The $As_2O_3$ content is preferably 0.6 mass % or less when another reboil gas component coexists.

The glass composition according to the present invention is intended for a multicomponent oxide glass consisting of a plurality of oxide components of 1 mass % or more each, and the number of oxide components which constitute a glass is desirably large. That is, a three-component system rather than a two-component system, a four-component system rather than a three-component system, and a five-component system rather than a four-component system are desirable respectively. Further, a six-, seven-component system or more is generally more desirable. A larger number of components generally reduces a melting temperature, thereby causing the bubbles to float easily. On the other hand, an atomic distance distribution among respective atoms in the molten glass consisting of multicomponents becomes broader than that of the molten glass consisting of a single component. As a result, sites of large atomic distance exist in the molten glass, providing an effect of easy diffusion of helium and neon in the molten glass.

Further, the glass composition of the present invention tends to obstruct a diffusion pathway of helium or neon when components having small atomic radii such as alkali metal elements are included in the composition. Thus, an amount of the alkali metal elements is desirably small. However, the alkali metal elements may be added when the inclusion of the alkali metal elements is desired in applications of the glass composition. Reduction in the viscosity of the molten glass by addition of the alkali metal elements promotes fining from the glass, thereby contributing to improvements of the fining effect.

Hereinafter, the glass composition containing the alkali metal elements will be described in detail.

A glass composition consisting of four or more oxide components and allowing a very small content of alkali metal element additives, for example, can be defined as follows.

That is, a glass composition manufactured by melting of glass raw materials and containing four or more oxide components as main components characterized by including: helium and/or neon in the above-described range; a fining component in the above-described range, as required; and alkali metal oxide elements such as $Li_2O$, $Na_2O$, and $K_2O$, so that the total content of the elements is 10 mass ppm or more and less than 0.3 mass %.

The alkali metal oxide elements reduce the viscosity of the molten glass. Reduction of the viscosity of the molten glass facilitates degassing by fining from the molten glass. To realize the effect even slightly, the total content of the alkali metal oxide elements must be 10 mass ppm or more. To enhance the effect, the total content of the alkali metal oxide elements is preferably 50 mass ppm or more. On the other hand, the alkali metal oxide elements may be reduced to minimum depending on an environment where the glass is used.

Alkali metals are desirably avoided as much as possible in sheet glass for a liquid crystal substrate used for electronic parts or the like, for example. For such an application, an upper limit of the total content of the alkali metal oxide elements is 0.3 mass %. Further, the total content of the alkali metal oxide elements is desirably less than 0.1 mass % if the requirements of the application are more demanding.

On the other hand, a glass composition capable of containing more alkali metal elements can be defined as follows.

That is, a glass composition manufactured by melting of glass raw materials and containing four or more oxide components as main components characterized by including: helium and/or neon in the above-described range; a fining agent component in the above-described range, as required; and alkali metal oxides such as $Li_2O$, $Na_2O$, and $K_2O$, so that the total content of the elements is 0.3 mass % or more and less than 16 mass %.

The glass composition used in applications allowing alkali metal oxide elements may contain alkali metal oxide elements in an amount of 0.3mass % or more as a total content, for further assuring the effects such as viscosity reduction of the molten glass. The total content of the alkali metal oxide elements is preferably 1.0 mass % or more, for realizing a more assured effect. On the other hand, basic physical properties of a glass exhibiting chemical resistance such as suppression of alkali elution may deteriorate by the addition of the alkali metal oxide elements, particularly with a relatively simple oxide of about four components. Thus, an upper limit of the total content of the alkali metal oxide elements is preferably less than 16mass %, in applications requiring chemical resistance. The upper limit must be further reduced to preferably less than 10mass % for a poor use environment of the glass composition.

A glass composition containing, for example, six or more oxide components can be defined as follows.

That is, a glass composition manufactured by melting of glass raw materials and containing six or more oxide components as main components characterized by including: helium and/or neon in the above-described range; a fining component in the above-described range, as required; and alkali metal oxides such as $Li_2O$, $Na_2O$, and $K_2O$, so that the total content of the elements is 16 mass % or more and less than 30 mass %.

As described above, the alkali metal oxide elements break the network in the glass structure and reduce the viscosity of the molten glass. Further, six or more oxide components constituting a glass facilitates diffusion of helium and/or neon in the molten glass. Thus, the glass composition consisting of six or more oxide components enables an improvement of a fining effect by combining the effect of reducing the viscosity of the molten glass and the effect of promoting the diffusion of helium and/or neon without restriction from the applications. Further, six or more oxide components constituting a glass provide a better effect of chemical resistance such as suppressing alkali elution by mutual combination of oxide components. Thus, the total content of the alkali metal oxide elements is preferably 16 mass % or more. On the other hand, too large a total content of the alkali metal oxide elements causes problems such as water resistance. Thus, the upper limit of the total content of the alkali metal oxide elements is preferably 30 mass % or less. The upper limit of the total content of the alkali metal oxide elements is preferably 20 mass % or less, particularly for a glass composition used in a poor environment.

Further, the glass composition of the present invention can appropriately contain: colorants such as transition metal element compounds, rare earths, Au, Ag, Cu, sulfides, tellurium compounds, and selenium compounds, exhibiting color with various colored ions, additives causing colloid coloring such as a CdS—CdSe solid solution, and radiation coloring additives such as Mn and Ce; and additives of scarce metal elements for adjusting refractive index. In contrast, elements such as U, Th, Fe, Ti, Pb, As, Cl, K, Cu, V, Cr, Mn, Pt, Mo, and Zr may be finely controlled as appropriate to a ppm order or a ppb order so that the glass composition contains a minimal amount of the elements to meet the requirements of the applications.

Of those, particularly Pt (platinum) may serve as a nucleus for bubble formation during foaming in the molten glass through intentional slight addition thereof, and is an effective component for promptly producing bubbles for assured fining. The amount of Pt addition is preferably 1 ppb or more, more preferably 50 ppb or more. On the other hand, an upper limit of the amount of Pt addition is preferably 50 ppm or more because an increased Pt content often adversely affects optical properties or appearance qualities. The upper limit of the amount of Pt addition is preferably 30 ppm in applications particularly requiring optical properties.

Further, the glass composition of the present invention may be manufactured by melting in a heat resistant material containing Pt As light amount of Pt intentionally added also provides an effect of reducing Pt elution from the heat resistant metal material, thereby preventing loss of glass homogeneity by formation of contaminants containing the eluted Pt in the molten glass or preventing color change of the glass by the eluted Pt.

Further, Mo (molybdenum) also may serve as a nucleus for bubble formation in the glass composition containing helium and/or neon, similar to Pt. A slight amount of Mo may be added in place of Pt, if not posing problems in properties of the glass composition. However, the effect of Mo is not as high as that of Pt, and thus, the amount of Mo addition is preferably 5 ppm or more. The amount of Mo addition is preferably 50 ppm or more for further assuring the effect by Mo addition. The amount of Mo addition can be increased to 1,000 ppm if not posing problems in optical uses. A preferable upper limit of the amount of Mo addition is 700 ppm.

Further, a slight amount of Zr (zirconium) added as $ZrO_2$ provides an effect of aiding diffusion of helium and/or neon in the molten glass by being coexistent with helium and/or neon. ZrO2 may be added in an amount of 5 ppm or more as Zr. Further, the amount of $zrO_2$ addition is preferably 50 ppm or more, for assuredly exhibiting the effect. On the other hand, an upper limit of the amount of $ZrO_2$ addition is preferably 5 mass % because $ZrO_2$ may increase the viscosity of the molten glass to obstruct the diffusion of helium and/or neon. Further, the upper limit of the amount of $ZrO_2$ addition may be 3 mass % if viscosity increase of the molten glass must be avoided.

The glass composition of the present invention can have a previously designed material composition enabling precipitation of a plurality of microcrystalline precipitates inside a glass body through reheat treatment and energy transfer such as laser irradiation.

Further, the glass composition of the present invention can cope with various manufacture conditions according to applications including: ion exchange treatment for imparting necessary optical properties, strength properties, or the like; provision of various thin films to a glass surface; implantation of specific ions to the glass surface; surface treatment with chemicals or the like for improving surface properties; solidification of radioactive substances or the like; rapid-quenching vitrification using liquid nitrogen, liquid helium, or the like; glass manufacture by ultra-high temperature melting using solar energy; special glass manufacture using a phenomenon of crystallization under ultra-high pressure conditions; and inclusion of specific additives for imparting other special electromagnetic properties.

DESCRIPTION OF PREFERRED EXAMPLES

Hereinafter, examples of the present invention will be described.

Example 1

Samples No. 1 to No. 10 in Table 1 represent glass compositions according to Example 1 of the present invention. A molten glass melted in advance to yield a predetermined composition was poured out onto a carbon plate, and a part thereof was subjected to chemical composition analysis using an ICP emission spectroscopy or the like. After the composition was determined, the molten glass was pulverized to a particle size of 0.5 to 2.0 mm using an alumina mortar. 50 g of the pulverized glass was poured into a platinum crucible. The crucible was placed in an atmosphere furnace of an airtight structure heated to 1,400° C. in advance, and was retained therein for 10 minutes. Then, helium (hereinafter, referred to as He) or neon (hereinafter, referred to as Ne), each adjusted to an appropriate concentration with nitrogen was introduced into the furnace as an atmospheric gas for 30-minute treatment. The ICP emission spectrometer used for chemical composition analysis (SPS1500VR, manufactured by Seiko Instruments Inc.) was equipped with secondary electron multiplier (SEM) for improved measurement sensitivity. One analysis required about 0.5 g of the glass. Note that, samples No. 1 to No. 10 in Table 1 correspond to the invention according to claim 1.

TABLE 1

| | Sample No. | | | | | | | | | |
|---|---|---|---|---|---|---|---|---|---|---|
| | 1 | 2 | 3 | 4 | 5 | 6 | 7 | 8 | 9 | 10 |
| (mass %) | | | | | | | | | | |
| $SiO_2$ | 63.2 | 63.2 | 63.2 | 63.5 | 63.3 | 63.0 | 63.2 | 63.0 | 62.8 | 62.9 |
| $Al_2O_3$ | 2.0 | 2.0 | 2.0 | 1.9 | 2.0 | 2.3 | 2.0 | 2.3 | 2.0 | 2.1 |
| SrO | 9.1 | 9.1 | 9.1 | 10.2 | 9.1 | 9.0 | 9.1 | 9.1 | 9.1 | 9.5 |
| BaO | 8.9 | 8.9 | 8.9 | 8.7 | 8.9 | 8.9 | 8.9 | 8.9 | 8.4 | 7.8 |
| $Na_2O$ | 7.6 | 7.6 | 7.6 | 7.5 | 7.6 | 7.6 | 7.6 | 7.9 | 7.6 | 6.9 |
| $K_2O$ | 7.7 | 7.7 | 7.7 | 8.2 | 7.6 | 7.7 | 7.7 | 7.8 | 8.8 | 9.2 |
| $ZrO_2$ | 1.5 | 1.5 | 1.5 | 0.0 | 1.5 | 1.5 | 1.5 | 1.0 | 1.3 | 1.6 |
| (µL/g) | | | | | | | | | | |
| He | 0.010 | 0.020 | 0.012 | 0.150 | 1.020 | 1.481 | 1.980 | <0.001 | 0.003 | 0.451 |
| Ne | <0.001 | <0.001 | <0.001 | <0.001 | <0.001 | <0.001 | <0.001 | 1.980 | 0.071 | 1.033 |
| Number of bubbles (bubbles/10 g) | 710 | 620 | 40 | 8 | 4 | ND | ND | ND | 350 | 8 |

Further, composition analysis after remelting confirmed that oxide compositions were the same as those before melting. The number of bubbles remaining in the glass was determined using a stereoscopic microscope of 20 to 100 power magnification while keeping the glass in an immersion liquid having the same refractive index as the glass. A He or Ne content was measured using a quadrupole mass spectrometer (QMA125, manufactured by Balzers AG) equipped with a secondary electron multiplier (SEM) for improved measurement sensitivity. Gas analysis using the quadrupole mass spectrometer involved: placing a glass sample to be measured in a platinum dish, keeping the platinum dish in a sample chamber to a vacuum of $10^{-5}$ Pa (that is, $10^{-8}$ Torr); and introducing a gas heated and discharged into the quadrupole mass spectrometer having a measurement sensitivity of 0.001 µL/g.

In Table 1, ND indicates that the sample could not be detected. The results of the investigation confirmed that all glass contained He and Ne. Further, the number of remaining bubbles confirmed that all samples had qualities for commercialization as glass compositions.

Comparative Example 1

Samples No. 11 to No. 20 in Table 2 represent glass compositions according to Comparative Example 1 of the present invention. Molten glass were prepared in the same manner as in Example 1, and samples No. 11 to No. 20 in Comparative Example 1 were produced by remelting in the same manner as in Example 1 except that the melting atmosphere was changed to an atmospheric condition.

TABLE 2

| | Sample No. | | | | | | | | | |
|---|---|---|---|---|---|---|---|---|---|---|
| | 11 | 12 | 13 | 14 | 15 | 16 | 17 | 18 | 19 | 20 |
| (mass %) | | | | | | | | | | |
| $SiO_2$ | 63.2 | 63.2 | 63.2 | 63.5 | 63.3 | 63.0 | 63.2 | 63.0 | 62.8 | 62.9 |
| $Al_2O_3$ | 2.0 | 2.0 | 2.0 | 1.9 | 2.0 | 2.3 | 2.0 | 2.3 | 2.0 | 2.1 |
| SrO | 9.1 | 9.1 | 9.1 | 10.2 | 9.1 | 9.0 | 9.1 | 9.1 | 9.1 | 9.5 |
| BaO | 8.9 | 8.9 | 8.9 | 8.7 | 8.9 | 8.9 | 8.9 | 8.9 | 8.4 | 7.8 |
| $Na_2O$ | 7.6 | 7.6 | 7.6 | 7.5 | 7.6 | 7.6 | 7.6 | 7.9 | 7.6 | 6.9 |
| $K_2O$ | 7.7 | 7.7 | 7.7 | 8.2 | 7.6 | 7.7 | 7.7 | 7.8 | 8.8 | 9.2 |
| $ZrO_2$ | 1.5 | 1.5 | 1.5 | 0.0 | 1.5 | 1.5 | 1.5 | 1.0 | 1.3 | 1.6 |
| (µL/g) | | | | | | | | | | |
| He | <0.001 | <0.001 | <0.001 | <0.001 | <0.001 | <0.001 | <0.001 | <0.001 | <0.001 | <0.001 |
| Ne | <0.001 | <0.001 | <0.001 | <0.001 | <0.001 | <0.001 | <0.001 | <0.001 | <0.001 | <0.001 |
| Number of bubbles (bubbles/10 g) | 1,320 | 870 | 1,060 | 2,570 | 1,850 | 890 | 950 | 790 | 880 | 780 |

As a result, the number of bubbles of the samples in Example 1 in Table 1 ranged from 72 bubbles/10 g to ND, while the number of bubbles of the samples in Comparative Example 1 in Table 2 ranged from 780 to 2,570 bubbles/10 g. The results confirmed that the samples in Comparative Example 1 had many bubbles having a micron-order bubble size and that the fining effect was not provided at all. A slight content of He or Ne of less than 0.001 µL/g was detected by contamination from air or the like without intentional addition. However, such a slight content hardly provides a significant effect as the present invention.

Example 2

Samples No. 21 to No. 90 in Tables 3 to 9 represent glass compositions according to Example 2 of the present invention. The glass compositions were prepared to contain fining components and were melted in the same manner as in Example 1. Steam bubbling was employed during melting for the glass compositions requiring a large water content. The melted samples were subjected to He and Ne analysis, and measurement of number of bubbles. Samples No. 21 to 30 in Table 3 correspond to the inventions according to claims 1 to 3. Further, sample No. 21 corresponds to the invention according claim 6; samples No. 24 and No. 28 correspond to the invention according to claim 4; sample No. 25 corresponds to the invention according to claim 9; sample No. 26 corresponds to the invention according to claim 8; sample No. 27 corresponds to the invention according to claim 7; and samples No. 23 and No. 30 correspond to the invention according to claim 5.

TABLE 3

| | Sample No. | | | | | | | | | |
|---|---|---|---|---|---|---|---|---|---|---|
| | 21 | 22 | 23 | 24 | 25 | 26 | 27 | 28 | 29 | 30 |
| (mass %) | | | | | | | | | | |
| $SiO_2$ | 64.2 | 64.2 | 64.2 | 63.5 | 63.3 | 62.7 | 63.1 | 64.0 | 62.8 | 63.0 |
| $Al_2O_3$ | 2.0 | 2.5 | 2.5 | 1.9 | 3.5 | 2.3 | 3.5 | 2.3 | 2.0 | 2.0 |
| SrO | 9.1 | 9.1 | 9.1 | 10.2 | 9.1 | 10.5 | 9.1 | 8.9 | 9.1 | 9.1 |
| BaO | 8.9 | 8.2 | 8.8 | 8.7 | 8.9 | 8.9 | 8.9 | 8.9 | 8.4 | 8.9 |
| $Na_2O$ | 7.6 | 7.6 | 7.6 | 7.3 | 7.6 | 7.6 | 7.6 | 7.9 | 7.6 | 7.6 |
| $K_2O$ | 7.7 | 7.7 | 7.7 | 8.2 | 7.4 | 7.7 | 7.7 | 7.8 | 8.8 | 7.7 |
| $ZrO_2$ | — | — | — | — | — | — | — | — | 1.3 | 1.5 |
| Cl | 0.5 | — | — | — | — | — | — | — | — | — |
| F | — | 0.7 | — | — | — | — | — | — | — | — |
| $SO_3$ | — | — | 0.1 | — | — | — | — | — | — | 0.2 |
| $Sb_2O_3$ | — | — | — | 0.2 | — | — | — | 0.2 | — | — |
| $As_2O_3$ | — | — | — | — | 0.2 | — | — | — | — | — |
| $SnO_2$ | — | — | — | — | — | 0.3 | — | — | — | — |
| $H_2O$ | — | — | — | — | — | — | 0.06 | — | — | — |
| (µL/g) | | | | | | | | | | |
| He | 1.200 | 1.503 | 1.201 | 1.005 | 0.906 | 1.500 | 1.006 | 1.100 | 0.452 | 0.421 |
| Ne | <0.001 | <0.001 | <0.001 | <0.001 | <0.001 | <0.001 | 0.303 | 0.012 | <0.001 | <0.001 |
| Number of bubbles (bubbles/10 g) | 7 | 4 | ND | ND | 0.03 | ND | ND | ND | 4 | ND |

In Table 4, samples No. 31 to No. 34 and No. 39 correspond to the inventions according to claims 1 to 3 and claim 6; and samples No. 35 to No. 38 and No. 40 correspond to the inventions according to claim 1, claim 2, and claim 3.

TABLE 4

| | Sample No. | | | | | | | | | |
|---|---|---|---|---|---|---|---|---|---|---|
| | 31 | 32 | 33 | 34 | 35 | 36 | 37 | 38 | 39 | 40 |
| (mass %) | | | | | | | | | | |
| $SiO_2$ | 63.2 | 64.2 | 64.2 | 63.0 | 63.5 | 62.1 | 63.1 | 64.0 | 62.8 | 63.1 |
| $Al_2O_3$ | 2.0 | 2.5 | 2.5 | 1.9 | 3.5 | 2.3 | 3.5 | 2.3 | 2.6 | 2.7 |
| SrO | 9.1 | 9.8 | 9.1 | 10.2 | 9.1 | 10.5 | 9.1 | 8.6 | 9.1 | 9.5 |
| BaO | 8.9 | 8.2 | 8.8 | 8.3 | 8.9 | 7.9 | 9.0 | 8.9 | 8.4 | 8.3 |
| $Na_2O$ | 7.6 | 7.6 | 7.6 | 7.3 | 7.6 | 7.6 | 7.6 | 6.9 | 7.6 | 6.6 |
| $K_2O$ | 7.7 | 7.7 | 7.8 | 8.2 | 7.4 | 7.7 | 7.7 | 7.8 | 8.8 | 9.2 |
| $ZrO_2$ | — | — | — | — | — | — | — | — | — | — |
| Cl | 1.5 | 0.03 | 0.02 | 1.1 | — | — | — | — | 0.7 | — |
| F | — | — | — | — | 0.04 | 1.9 | 0.02 | 1.5 | — | 0.6 |
| $SO_3$ | — | — | — | — | — | — | — | — | — | — |
| $Sb_2O_3$ | — | — | — | — | — | — | — | — | — | — |
| $As_2O_3$ | — | — | — | — | — | — | — | — | — | — |
| $SnO_2$ | — | — | — | — | — | — | — | — | — | — |
| $H_2O$ | | | | | | | | | | |

TABLE 4-continued

| | Sample No. | | | | | | | | | |
|---|---|---|---|---|---|---|---|---|---|---|
| | 31 | 32 | 33 | 34 | 35 | 36 | 37 | 38 | 39 | 40 |
| (µL/g) | | | | | | | | | | |
| He | 0.430 | 0.782 | 0.650 | 0.553 | 0.524 | 0.531 | 0.725 | 0.683 | 0.990 | 1.652 |
| Ne | <0.001 | <0.001 | <0.001 | <0.001 | <0.001 | <0.001 | 0.032 | 0.010 | 0.211 | <0.001 |
| Number of bubbles (bubbles/10 g) | 4 | 8 | 8 | 4 | ND | ND | ND | ND | ND | ND |

Samples No. 41 to No. 50 in Table 5 correspond to the inventions according to claims 1 to 3 and claim 5. Further, sample No. 44 and sample No. 47 correspond to the inventions according to claim 11 and claim 8, respectively.

TABLE 5

| | Sample No. | | | | | | | | | |
|---|---|---|---|---|---|---|---|---|---|---|
| | 41 | 42 | 43 | 44 | 45 | 46 | 47 | 48 | 49 | 50 |
| (mass %) | | | | | | | | | | |
| $SiO_2$ | 64.3 | 64.2 | 64.2 | 63.0 | 63.5 | 62.3 | 63.0 | 64.1 | 63.1 | 62.9 |
| $Al_2O_3$ | 2.3 | 2.5 | 2.4 | 1.9 | 3.4 | 2.3 | 3.5 | 2.3 | 2.6 | 3.6 |
| SrO | 8.8 | 9.8 | 9.1 | 10.3 | 9.1 | 11.3 | 9.1 | 8.6 | 9.1 | 9.5 |
| BaO | 8.9 | 8.2 | 8.8 | 8.3 | 8.9 | 7.9 | 9.0 | 9.0 | 8.4 | 7.8 |
| $Na_2O$ | 7.8 | 7.6 | 7.6 | 7.7 | 7.6 | 7.6 | 7.6 | 6.9 | 7.6 | 6.6 |
| $K_2O$ | 7.9 | 7.7 | 7.8 | 8.2 | 6.8 | 7.7 | 7.3 | 7.9 | 8.8 | 9.2 |
| $ZrO2$ | — | — | — | — | — | — | — | 0.9 | — | — |
| Cl | — | — | — | 0.1 | — | — | — | — | — | — |
| F | — | — | — | — | — | — | — | — | — | — |
| $SO_3$ | 0.006 | 0.02 | 0.08 | 0.42 | 0.79 | 0.928 | 0.35 | 0.28 | 0.45 | 0.44 |
| $Sb_2O_3$ | — | — | — | — | — | — | — | — | — | — |
| $As_2O_3$ | — | — | — | — | — | — | — | — | — | — |
| $SnO_2$ | — | — | — | — | — | — | 0.2 | — | — | — |
| $H_2O$ | — | — | — | — | — | — | — | — | — | — |
| (µL/g) | | | | | | | | | | |
| He | 0.430 | 0.782 | 0.643 | 0.553 | 0.525 | 0.531 | 0.724 | 0.683 | 0.991 | 1.655 |
| Ne | <0.001 | <0.001 | <0.001 | <0.001 | <0.001 | <0.001 | 0.030 | 0.011 | 0.210 | <0.001 |
| Number of bubbles (bubbles/10 g) | 7 | 7 | 6 | ND | ND | ND | ND | ND | ND | ND |

Samples No. 51 to No. 60 in Table 6 correspond to the inventions according to claims 1 to 3 and claim 4. Further, sample No. 53 and sample No. 57 correspond to the inventions according to claim 6 and claim 7, respectively.

TABLE 6

| | Sample No. | | | | | | | | | |
|---|---|---|---|---|---|---|---|---|---|---|
| | 51 | 52 | 53 | 54 | 55 | 56 | 57 | 58 | 59 | 60 |
| (mass %) | | | | | | | | | | |
| $SiO_2$ | 64.3 | 64.2 | 64.2 | 63.0 | 63.5 | 62.3 | 63.0 | 64.1 | 63.1 | 62.9 |
| $Al_2O_3$ | 2.3 | 2.4 | 2.3 | 1.9 | 3.4 | 2.3 | 3.5 | 2.3 | 2.6 | 3.6 |
| SrO | 8.8 | 9.8 | 9.1 | 10.3 | 8.4 | 11.4 | 9.0 | 8.3 | 9.1 | 9.5 |
| BaO | 8.9 | 8.2 | 8.4 | 8.3 | 8.9 | 7.9 | 9.0 | 9.0 | 8.3 | 7.8 |
| $Na_2O$ | 7.8 | 7.6 | 7.6 | 6.8 | 7.6 | 7.6 | 7.6 | 6.9 | 7.6 | 6.6 |
| $K_2O$ | 7.9 | 7.7 | 7.8 | 8.2 | 6.8 | 7.7 | 7.3 | 7.9 | 8.8 | 9.3 |
| $ZrO_2$ | — | — | — | — | — | — | — | 0.9 | — | — |
| Cl | — | — | 0.1 | — | — | — | — | — | — | — |
| F | — | — | — | — | — | — | — | — | — | — |
| $SO_3$ | — | — | — | — | — | — | — | — | — | — |
| $Sb_2O_3$ | 0.02 | 0.1 | 0.5 | 1.45 | 1.5 | 0.8 | 0.65 | 0.57 | 0.55 | 0.32 |

TABLE 6-continued

| | Sample No. | | | | | | | | | |
|---|---|---|---|---|---|---|---|---|---|---|
| | 51 | 52 | 53 | 54 | 55 | 56 | 57 | 58 | 59 | 60 |
| $As_2O_3$ | — | — | — | — | — | — | — | — | — | — |
| $SnO_2$ | — | — | — | — | — | — | — | — | — | — |
| $H_2O$ | — | — | — | — | — | — | 0.02 | — | — | — |
| (μL/g) | | | | | | | | | | |
| He | 0.431 | 0.765 | 0.644 | 0.586 | 0.524 | 0.530 | 0.724 | 0.683 | 0.982 | 1.387 |
| Ne | <0.001 | <0.001 | <0.001 | <0.001 | <0.001 | <0.001 | 0.062 | 0.020 | 0.226 | <0.001 |
| Number of bubbles (bubbles/10 g) | 8 | 7 | 3 | ND | ND | ND | ND | ND | ND | ND |

Samples No. 61 to No. 70 in Table 7 correspond to the inventions according to claims 1 to 3 and claim 9. Further, sample No. 65 corresponds to the invention according to claim 7; sample No. 66 corresponds to the invention according to claim 5; and sample No. 67 corresponds to the inventions according claim 4 and claim 12.

TABLE 7

| | Sample No. | | | | | | | | | |
|---|---|---|---|---|---|---|---|---|---|---|
| | 61 | 62 | 63 | 64 | 65 | 66 | 67 | 68 | 69 | 70 |
| (mass %) | | | | | | | | | | |
| $SiO_2$ | 64.3 | 64.2 | 64.2 | 63.3 | 64.2 | 62.3 | 63.0 | 64.2 | 63.1 | 62.8 |
| $Al_2O_3$ | 2.3 | 2.4 | 2.3 | 1.9 | 3.4 | 2.3 | 3.4 | 2.3 | 2.6 | 3.5 |
| SrO | 8.8 | 9.8 | 9.1 | 10.0 | 8.4 | 11.4 | 9.1 | 8.6 | 9.2 | 9.5 |
| BaO | 8.9 | 8.3 | 8.4 | 8.3 | 9.0 | 7.9 | 9.1 | 9.2 | 8.3 | 7.7 |
| $Na_2O$ | 7.8 | 7.6 | 7.6 | 6.8 | 7.6 | 7.7 | 7.6 | 6.9 | 7.6 | 6.6 |
| $K_2O$ | 7.9 | 7.7 | 7.5 | 8.2 | 6.8 | 7.9 | 7.3 | 7.9 | 8.8 | 9.3 |
| $ZrO_2$ | — | — | — | — | — | — | — | 0.7 | — | — |
| Cl | — | — | — | — | — | — | — | — | — | — |
| F | — | — | — | — | — | — | — | — | — | — |
| $SO_3$ | — | — | — | — | — | 0.02 | — | — | — | — |
| $Sb_2O_3$ | — | — | — | — | — | — | 0.11 | — | — | — |
| $As_2O_3$ | 0.02 | 0.05 | 0.95 | 1.42 | 0.63 | 0.51 | 0.33 | 0.21 | 0.43 | 0.68 |
| $SnO_2$ | — | — | — | — | — | — | — | — | — | — |
| $H_2O$ | — | — | — | — | 0.11 | — | — | — | — | — |
| (μL/g) | | | | | | | | | | |
| He | 0.431 | 0.765 | 0.644 | 0.586 | 0.524 | 0.530 | 0.724 | 0.683 | 0.982 | 1.387 |
| Ne | <0.001 | <0.001 | <0.001 | <0.001 | <0.001 | <0.001 | 0.061 | 0.048 | 0.183 | <0.001 |
| Number of bubbles (bubbles/10 g) | 8 | 6 | 3 | ND | ND | ND | ND | ND | ND | ND |

Samples No. 71 to No. 80 in Table 8 correspond to the inventions according to claims 1 to 3 and claim 8. Further, sample No. 74 and sample No. 77 correspond to the inventions according to claim 6 and claim 7, respectively.

TABLE 8

| | Sample No. | | | | | | | | | |
|---|---|---|---|---|---|---|---|---|---|---|
| | 71 | 72 | 73 | 74 | 75 | 76 | 77 | 78 | 79 | 80 |
| (mass %) | | | | | | | | | | |
| $SiO_2$ | 64.3 | 64.2 | 64.5 | 63.9 | 63.9 | 61.9 | 63.0 | 64.2 | 63.1 | 62.8 |
| $Al_2O_3$ | 2.3 | 2.4 | 2.3 | 1.9 | 3.2 | 2.3 | 3.4 | 2.3 | 2.6 | 3.5 |
| SrO | 8.8 | 9.8 | 9.1 | 10.2 | 8.3 | 11.2 | 9.0 | 8.4 | 9.2 | 9.6 |
| BaO | 8.9 | 8.3 | 8.4 | 8.3 | 9.0 | 7.9 | 9.1 | 9.2 | 8.3 | 7.7 |

TABLE 8-continued

| | Sample No. | | | | | | | | | |
|---|---|---|---|---|---|---|---|---|---|---|
| | 71 | 72 | 73 | 74 | 75 | 76 | 77 | 78 | 79 | 80 |
| $Na_2O$ | 7.8 | 7.6 | 7.6 | 6.8 | 7.7 | 7.7 | 7.6 | 6.9 | 7.6 | 6.6 |
| $K_2O$ | 7.9 | 7.7 | 7.5 | 8.2 | 6.5 | 7.9 | 7.2 | 7.9 | 8.8 | 9.3 |
| $ZrO_2$ | — | — | — | — | — | — | — | 0.7 | — | — |
| Cl | — | — | — | 0.1 | — | — | — | — | — | — |
| F | — | — | 0.21 | — | — | — | — | — | — | — |
| $SO_3$ | — | — | — | — | — | — | — | — | — | — |
| $Sb_2O_3$ | — | — | — | — | — | — | — | — | — | — |
| $As_2O_3$ | — | — | — | — | — | — | — | — | — | — |
| $SnO_2$ | 0.001 | 0.057 | 0.451 | 0.682 | 1.502 | 1.201 | 0.563 | 0.351 | 0.411 | 0.562 |
| $H_2O$ ($\mu L/g$) | — | — | — | — | — | — | 0.06 | — | — | — |
| He | 0.186 | 0.356 | 0.655 | 0.586 | 0.522 | 0.128 | 0.724 | 0.358 | 0.958 | 1.024 |
| Ne | <0.001 | <0.001 | 0.002 | <0.001 | <0.001 | 0.211 | 0.021 | 0.039 | 0.180 | <0.001 |
| Number of bubbles (bubbles/10 g) | 5 | ND | ND | ND | 3 | ND | ND | ND | ND | ND |

Samples No. 81 to No. 90 in Table 9 correspond to the inventions according to claims 1 to 3 and claim 7. Further, sample No. 83, sample No. 86, and sample No. 88 correspond to the inventions according to claim 4, claim 6, and claim 9, respectively.

TABLE 9

| | Sample No. | | | | | | | | | |
|---|---|---|---|---|---|---|---|---|---|---|
| | 81 | 82 | 83 | 84 | 85 | 86 | 87 | 88 | 89 | 90 |
| (mass %) | | | | | | | | | | |
| $SiO_2$ | 64.3 | 64.2 | 64.5 | 64.0 | 63.9 | 61.9 | 63.0 | 64.6 | 63.1 | 62.8 |
| $Al_2O_3$ | 2.3 | 2.4 | 2.8 | 1.6 | 4.2 | 3.1 | 3.4 | 2.5 | 2.5 | 3.5 |
| SrO | 8.8 | 9.8 | 9.1 | 11.1 | 8.3 | 11.8 | 9.0 | 8.5 | 9.4 | 9.6 |
| BaO | 8.9 | 8.3 | 8.4 | 8.3 | 9.1 | 7.8 | 9.1 | 9.3 | 8.5 | 7.7 |
| $Na_2O$ | 7.8 | 7.6 | 7.6 | 6.5 | 7.9 | 7.6 | 7.7 | 6.9 | 7.6 | 6.6 |
| $K_2O$ | 7.9 | 7.7 | 7.5 | 8.1 | 6.5 | 7.7 | 7.2 | 7.9 | 9.0 | 9.8 |
| $ZrO_2$ | — | — | — | 0.3 | — | — | — | — | — | — |
| Cl | — | — | — | — | — | 0.05 | — | — | — | — |
| F | — | — | — | — | — | — | 0.5 | — | — | — |
| $SO_3$ | — | — | — | — | — | — | — | — | — | — |
| $Sb_2O_3$ | — | — | 0.12 | — | — | — | — | — | — | — |
| $As_2O_3$ | — | — | — | — | — | — | — | 0.2 | — | — |
| $SnO_2$ | — | — | — | — | — | — | — | — | — | — |
| $H_2O$ ($\mu L/g$) | 0.01 | 0.03 | 0.09 | 0.08 | 0.14 | 0.11 | 0.1 | 0.11 | 0.07 | 0.06 |
| He | 0.211 | 0.523 | 0.662 | 0.556 | 0.534 | 0.539 | 0.754 | 0.658 | 0.945 | 1.325 |
| Ne | <0.001 | <0.001 | <0.001 | 0.010 | <0.001 | <0.001 | 0.061 | 0.033 | 0.170 | <0.001 |
| Number of bubbles (bubbles/10 g) | 9 | 6 | 3 | ND | ND | ND | ND | ND | ND | ND |

Tables 3 to 9 confirmed that each of samples No. 21 to No. 90 in Example No. 2 contained a predetermined amount or more of He and Ne in total and had a small number of bubbles.

Comparative Example 2

Samples No. 91 to No. 100 in Table 10 represent glass compositions according to Comparative Example 2 of the present invention. Molten glass were prepared in the same manner as in Example 2, and samples No. 91 to 100 in Comparative Example 2 were produced by remelting in the same manner as in Example 2 except that the melting atmosphere was changed to an atmospheric condition.

TABLE 10

| | Sample No. | | | | | | | | | |
|---|---|---|---|---|---|---|---|---|---|---|
| | 91 | 92 | 93 | 94 | 95 | 96 | 97 | 98 | 99 | 100 |
| (mass %) | | | | | | | | | | |
| $SiO_2$ | 64.2 | 64.2 | 64.2 | 63.5 | 63.3 | 62.7 | 63.1 | 64.0 | 62.8 | 62.9 |
| $Al_2O_3$ | 2.0 | 2.5 | 2.5 | 1.9 | 3.5 | 2.3 | 3.5 | 2.3 | 2.0 | 2.8 |
| SrO | 9.1 | 9.1 | 9.1 | 10.2 | 9.1 | 10.5 | 9.1 | 8.9 | 9.1 | 9.5 |
| BaO | 8.9 | 8.2 | 8.8 | 8.7 | 8.9 | 8.9 | 8.9 | 8.9 | 8.4 | 7.8 |
| $Na_2O$ | 7.6 | 7.6 | 7.6 | 7.3 | 7.6 | 7.6 | 7.6 | 7.9 | 7.6 | 6.6 |
| $K_2O$ | 7.7 | 7.7 | 7.7 | 8.2 | 7.4 | 7.7 | 7.7 | 7.8 | 8.8 | 9.2 |
| $ZrO_2$ | — | — | — | — | — | — | — | — | 1.3 | — |
| Cl | 0.5 | — | — | — | — | — | — | — | — | 1.2 |
| F | — | 0.7 | — | — | — | — | — | — | — | — |
| $SO_3$ | — | — | 0.1 | — | — | — | — | — | — | — |
| $Sb_2O_3$ | — | — | — | 0.2 | — | — | — | 0.2 | — | — |
| $As_2O_3$ | — | — | — | — | 0.2 | — | — | — | — | — |
| $SnO_2$ | — | — | — | — | — | 0.3 | — | — | — | — |
| $H_2O$ | — | — | — | — | — | — | 0.06 | — | — | — |
| (µL/g) | | | | | | | | | | |
| He | <0.001 | <0.001 | <0.001 | <0.001 | <0.001 | <0.001 | <0.001 | <0.001 | <0.001 | <0.001 |
| Ne | <0.001 | <0.001 | <0.001 | <0.001 | <0.001 | <0.001 | <0.001 | <0.001 | <0.001 | <0.001 |
| Number of bubbles (bubbles/10 g) | 520 | 350 | 440 | 100 | 220 | 590 | 1,020 | 350 | 550 | 1,210 |

The samples in Comparative Example 2 contain fining components, and thus, the number of bubbles in the samples is reduced compared to the samples without the fining agent. However, the samples in Comparative Example 2 had more bubbles than the samples containing He and Ne in Example 2.

Example 3

Samples No. 101 to No. 110 in Table 11 represent glass compositions according to Example 3 of the present invention. A molten glass melted in a He (99.9999% purity) melting atmosphere at 1,400° C. for 40 minutes in advance to yield a predetermined composition was poured out onto a carbon plate, and a part thereof was subjected to chemical composition analysis. After the composition was determined, the molten glass was pulverized to a particle size of 0.2 to 0.5 mm using an alumina mortar. 50 g of the pulverized coarse-grained glass was poured into a platinum crucible. The crucible was placed in an atmosphere furnace of an airtight structure heated to 1,500° C. in advance, retained therein for 10 minutes for remelting, and taken out. After cooling, composition analysis after remelting confirmed that compositions were the same as those before melting. The size of bubbles remaining in the glass was determined using a stereoscopic microscope of 20 to 100 power magnification while keeping the glass in an immersion liquid having the same refractive index as the glass.

Samples No. 101 to No. 110 in Table 11 correspond to the invention according to claim 1; and samples No. 101 to No. 108 and No. 110 correspond to the inventions according to claims 2 and 3. Further, sample No. 101 corresponds to the invention according to claim 6; samples No. 103 and No. 110 correspond to the invention according to claim 5; samples No. 104 and No. 108 correspond to the invention according to claim 4; sample No. 105 corresponds to the invention according to claim 9; sample No. 106 corresponds to the invention according to claim 8; and sample No. 107 corresponds the invention according to claim 7.

TABLE 11

| | Sample No. | | | | | | | | | |
|---|---|---|---|---|---|---|---|---|---|---|
| | 101 | 102 | 103 | 104 | 105 | 106 | 107 | 108 | 109 | 110 |
| (mass %) | | | | | | | | | | |
| $SiO_2$ | 64.1 | 64.3 | 64.2 | 63.5 | 63.2 | 62.8 | 63.3 | 63.8 | 62.8 | 63.0 |
| $Al_2O_3$ | 2.0 | 2.5 | 2.6 | 2.0 | 3.5 | 2.3 | 3.5 | 2.5 | 2.2 | 2.0 |
| SrO | 9.2 | 9.1 | 9.1 | 10.2 | 9.1 | 10.5 | 9.1 | 8.9 | 9.1 | 9.1 |
| BaO | 8.9 | 8.1 | 8.8 | 8.7 | 9.0 | 8.8 | 8.9 | 8.9 | 8.4 | 8.9 |
| $Na_2O$ | 7.6 | 7.6 | 7.6 | 7.4 | 7.6 | 7.6 | 7.6 | 7.9 | 7.6 | 7.6 |
| $K_2O$ | 7.7 | 7.7 | 7.6 | 8.0 | 7.4 | 7.7 | 7.5 | 7.8 | 8.8 | 7.7 |
| $ZrO_2$ | — | — | — | — | — | — | — | — | 1.1 | 1.5 |
| Cl | 0.5 | — | — | — | — | — | — | — | — | — |
| F | — | 0.7 | — | — | — | — | — | — | — | — |
| $SO_3$ | — | — | 0.1 | — | — | — | — | — | — | 0.2 |
| $Sb_2O_3$ | — | — | — | 0.2 | — | — | — | 0.2 | — | — |
| $As_2O_3$ | — | — | — | — | 0.2 | — | — | — | — | — |
| $SnO_2$ | — | — | — | — | — | 0.3 | — | — | — | — |
| $H_2O$ | — | — | — | — | — | — | 0.06 | — | — | — |
| (μL/g) | | | | | | | | | | |
| He | 1.120 | 1.495 | 1.235 | 1.102 | 0.985 | 1.480 | 1.002 | 1.098 | 0.348 | 0.421 |
| Ne | 0.003 | <0.001 | <0.001 | <0.001 | <0.001 | <0.001 | 0.302 | 0.011 | <0.001 | <0.001 |
| Average bubble size (mm) | <0.1 | <0.1 | <0.1 | <0.1 | <0.1 | <0.1 | <0.1 | <0.1 | <0.1 | <0.1 |

Comparative Example 3

Samples No. 111 to No. 120 in Table 12 represent glass compositions according to Comparative Example 3 of the present invention. Molten glass were prepared in the same manner as in Example 3, and samples No. 111 to No. 120 in Comparative Example 3 were produced by remelting in the same manner as in Example 3 except that the melting atmosphere was changed to an atmospheric condition.

As a result, an average size of the bubbles remaining ranged from 0.49 mm to 1 mm for the samples in Comparative Example 3 subjected to atmospheric treatment while the average size of the bubbles remaining was 0.1 mm or less for the samples in Example 3 subjected to He or Ne treatment. The results confirmed that reheat treatment prevents reboiling.

Example 4

Samples No. 121 to No. 170 in Tables 13 to 17 represent glass compositions according to Example 4 of the present invention. Of those, samples No. 121 to No. 160 were produced by: pouring into a platinum crucible a batch of about 500 g of glass prepared in advance to yield a predetermined composition; placing the crucible in an atmosphere furnace of

TABLE 12

| | Sample No. | | | | | | | | | |
|---|---|---|---|---|---|---|---|---|---|---|
| | 111 | 112 | 113 | 114 | 115 | 116 | 117 | 118 | 119 | 120 |
| (mass %) | | | | | | | | | | |
| $SiO_2$ | 64.1 | 64.3 | 64.2 | 63.5 | 63.2 | 62.8 | 63.3 | 63.8 | 62.8 | 63.0 |
| $Al_2O_3$ | 2.0 | 2.5 | 2.6 | 2.0 | 3.5 | 2.3 | 3.5 | 2.5 | 2.2 | 2.0 |
| SrO | 9.2 | 9.1 | 9.1 | 10.2 | 9.1 | 10.5 | 9.1 | 8.9 | 9.1 | 9.1 |
| BaO | 8.9 | 8.1 | 8.8 | 8.7 | 9.0 | 8.8 | 8.9 | 8.9 | 8.4 | 8.9 |
| $Na_2O$ | 7.6 | 7.6 | 7.6 | 7.4 | 7.6 | 7.6 | 7.6 | 7.9 | 7.6 | 7.6 |
| $K_2O$ | 7.7 | 7.7 | 7.6 | 8.0 | 7.4 | 7.7 | 7.5 | 7.8 | 8.8 | 7.7 |
| $ZrO_2$ | — | — | — | — | — | — | — | — | 1.1 | 1.5 |
| Cl | 0.5 | — | — | — | — | — | — | — | — | — |
| F | — | 0.7 | — | — | — | — | — | — | — | — |
| $SO_3$ | — | — | 0.1 | — | — | — | — | — | — | 0.2 |
| $Sb_2O_3$ | — | — | — | 0.2 | — | — | — | 0.2 | — | — |
| $As_2O_3$ | — | — | — | — | 0.2 | — | — | — | — | — |
| $SnO_2$ | — | — | — | — | — | 0.3 | — | — | — | — |
| $H_2O$ | — | — | — | — | — | — | 0.06 | — | — | — |
| (μL/g) | | | | | | | | | | |
| He | <0.001 | <0.001 | <0.001 | <0.001 | <0.001 | <0.001 | <0.001 | <0.001 | <0.001 | <0.001 |
| Ne | <0.001 | <0.001 | <0.001 | <0.001 | <0.001 | <0.001 | <0.001 | <0.001 | <0.001 | <0.001 |
| Average bubble size (mm) | 0.80 | 1.00 | 0.86 | 0.92 | 0.78 | 0.86 | 0.68 | 0.58 | 0.85 | 0.49 | an airtight structure heated to 1,400° C., 1,450° C., 1,500° C., and 1,550° C. in advance, depending on the kind of glass compositions, respectively; and retaining the crucible in the furnace for 4 hours. Further, samples No. 161 to No. 170 in Table 17 were produced by melting in the same furnace at 1,550° C. for 2 hours. Samples No. 121 to No. 160 were produced by: placing a crucible containing glass in the furnace; retaining the crucible therein for 4 hours; introducing an atmospheric gas having 95% or more He or Ne concentration into the furnace; and retaining the crucible at a predetermined temperature for 30 minutes. Further, samples No. 161 to No. 170 in Table 17 were produced through treatment in a He atmosphere at 1,600° C. for 2 hours. Then, each sample was taken out from the furnace and poured out into a mold made of glassy carbon for molding. After cooling, analysis after remelting confirmed that compositions were the same as those before melting. The size of bubbles remaining in the glass was determined using a stereoscopic microscope of 20 to 100 power magnification while keeping the glass in an immersion liquid having the same refractive index as the glass.

Samples No. 121 to No. 125 and No. 127 to No. 130 in Table 13 correspond to the inventions according to claims 1 to 3 and claim 4. Further, sample No. 126 corresponds to the inventions according to claims 1 to 3 and claim 5.

TABLE 13

| | Sample No. | | | | | | | | | |
|---|---|---|---|---|---|---|---|---|---|---|
| | 121 | 122 | 123 | 124 | 125 | 126 | 127 | 128 | 129 | 130 |
| (mass %) | | | | | | | | | | |
| $SiO_2$ | 71.8 | 69.8 | 71.5 | 72.7 | 72.2 | 71.3 | 70.3 | 65.1 | 71.4 | 68.6 |
| $Al_2O_3$ | 2.0 | 1.7 | 2.2 | 1.8 | 1.6 | 1.5 | 1.8 | 2.3 | 1.8 | 3.0 |
| $B_2O_3$ | — | 1.1 | — | — | — | 1.2 | 1.0 | 1.6 | 2.5 | 1.0 |
| MgO | 4.5 | 3.1 | 3.0 | 2.7 | 2.6 | 3.2 | 3.7 | 5.6 | 4.8 | 3.7 |
| CaO | 4.3 | 6.1 | 5.6 | 4.7 | 5.4 | 5.1 | 4.8 | 5.4 | 3.9 | 4.2 |
| BaO | — | 0.4 | — | — | — | — | — | — | — | 0.2 |
| $Na_2O$ | 16.1 | 15.8 | 15.6 | 16.4 | 16.9 | 16.8 | 15.9 | 16.5 | 12.9 | 17.1 |
| $K_2O$ | 0.8 | 1.3 | 1.4 | 1.2 | 0.8 | 0.9 | 1.3 | 2.1 | 1.3 | 1.1 |
| $P_2O_5$ | — | 0.2 | 0.2 | — | — | — | 0.4 | 0.8 | 0.5 | 0.4 |
| $Fe_2O_3$ | — | 0.1 | 0.1 | 0.1 | 0.1 | 0.1 | 0.1 | 0.1 | 0.1 | 0.1 |
| $SO_3$ | — | — | — | — | — | 0.15 | 0.2 | 0.1 | 0.3 | 0.2 |
| $Sb_2O_3$ | 0.5 | 0.5 | 0.4 | 0.5 | 0.4 | — | 0.6 | 0.5 | 0.6 | 0.5 |
| (μL/g) | | | | | | | | | | |
| He | 0.300 | 0.536 | 0.253 | 0.425 | 0.356 | 0.564 | 0.452 | 0.568 | 0.554 | 0.452 |
| Ne | <0.001 | 0.01 | <0.001 | <0.001 | <0.001 | <0.001 | <0.001 | <0.001 | <0.001 | <0.001 |
| Number of bubbles (bubbles/10 g) | 1 | 2 | 1 | 1 | 1 | ND | ND | ND | ND | 2 |

Samples No. 131 to No. 140 in Table 14 correspond to the inventions according to claims 1 to 3 and claim 4.

TABLE 14

| | Sample No. | | | | | | | | | |
|---|---|---|---|---|---|---|---|---|---|---|
| | 131 | 132 | 133 | 134 | 135 | 136 | 137 | 138 | 139 | 140 |
| (mass %) | | | | | | | | | | |
| $SiO_2$ | 63.1 | 60.6 | 61.0 | 60.6 | 60.9 | 63.1 | 64.0 | 62.4 | 51.9 | 46.6 |
| $Al_2O_3$ | 2.0 | 1.9 | 2.0 | 1.9 | 3.6 | 3.3 | 1.8 | 2.1 | 4.5 | 3.7 |
| MgO | — | 0.3 | 0.4 | 0.3 | 0.9 | 0.7 | — | — | 1.5 | — |
| CaO | — | 1.1 | 1.8 | 1.1 | 1.7 | 0.9 | 2.8 | — | 3.6 | 1.5 |
| SrO | 9.1 | 7.9 | 7.6 | 8.1 | 2.5 | 6.9 | 9.2 | 8.9 | 0.9 | 2.3 |
| BaO | 8.9 | 8.9 | 9.1 | 9.1 | 12.5 | 8.4 | 2.1 | 8.6 | 1.1 | 0.1 |
| ZnO | — | — | — | — | 0.4 | — | — | 0.5 | — | — |
| PbO | — | — | — | — | — | — | 2.9 | — | — | 32.8 |
| $Li_2O$ | — | — | 0.2 | — | — | — | — | — | 21.8 | — |
| $Na_2O$ | 7.6 | 7.8 | 7.5 | 7.6 | 8.2 | 9.0 | 8.0 | 7.8 | 6.1 | 2.7 |
| $K_2O$ | 7.6 | 8.1 | 7.0 | 7.9 | 7.9 | 7.1 | 7.9 | 7.9 | 8.1 | 9.9 |
| $CeO_2$ | — | 0.4 | 0.3 | 0.3 | 0.2 | 0.2 | 0.3 | 0.2 | — | — |
| $ZrO_2$ | 1.5 | 2.2 | 2.5 | 2.3 | — | — | — | — | 0.2 | — |
| $TiO_2$ | — | 0.5 | 0.4 | 0.5 | 0.6 | 0.1 | 0.4 | 0.6 | 0.1 | — |
| $Fe_2O_3$ | — | 0.05 | 0.03 | 0.06 | 0.04 | 0.05 | 0.05 | 0.05 | 0.07 | 0.05 |
| $Nd_2O_3$ | — | — | — | — | — | — | — | 0.4 | — | — |
| F | — | 0.09 | 0.02 | 0.02 | — | 0.02 | 0.02 | — | — | — |
| $Sb_2O_3$ | 0.2 | 0.25 | 0.3 | 0.25 | 0.5 | 0.4 | 0.5 | 0.3 | 0.15 | 0.4 |
| (μL/g) | | | | | | | | | | |
| He | 0.400 | 0.552 | 0.389 | 0.624 | 0.524 | 0.386 | 0.210 | 0.352 | 0.181 | 0.130 |
| Ne | <0.001 | 0.022 | <0.001 | <0.001 | <0.001 | <0.001 | <0.001 | <0.001 | <0.001 | <0.001 |

TABLE 14-continued

| | Sample No. | | | | | | | | | |
|---|---|---|---|---|---|---|---|---|---|---|
| | 131 | 132 | 133 | 134 | 135 | 136 | 137 | 138 | 139 | 140 |
| Number of bubbles (bubbles/10 g) | 1 | 1 | 1 | 1 | 1 | ND | ND | ND | ND | 2 |

Samples No. 141, No. 143 to No. 146, and No. 148 in Table 15 correspond to the inventions according to claims 1 to 3 and 4. Further, samples No. 142, No. 147, and No. 149 to No. 150 correspond to the invention according to claim 1; samples No. 143 and No. 146 correspond to the inventions according to claims 8 and 10; samples No. 149 and No. 150 correspond to the inventions according to claims 2, 3, and 9; and samples No. 145 and No. 146 correspond to the inventions according to claims 9 and 12.

Samples No. 151 to No. 154, No. 156, and No. 158 to No. 160 in Table 16 correspond to the inventions according to claims 1 to 3. Further, sample No. 155 corresponds to the invention according to claim 1; samples No. 151 and No. 160 correspond to the invention according to claim 9; samples No. 152 and No. 158 to No. 160 correspond to the invention according to claim 4; sample No. 153 corresponds to the

TABLE 15

| | Sample No. | | | | | | | | | |
|---|---|---|---|---|---|---|---|---|---|---|
| | 141 | 142 | 143 | 144 | 145 | 146 | 147 | 148 | 149 | 150 |
| (mass %) | | | | | | | | | | |
| $SiO_2$ | 71.9 | 54.6 | 59.9 | 67.5 | 67.8 | 60.9 | 69.9 | 70.4 | 55.3 | 55.8 |
| $Al_2O_3$ | 7.0 | 14.0 | 15.1 | 22.0 | 22.2 | 13.5 | 5.3 | 1.9 | 11.0 | 11.5 |
| $B_2O_3$ | 11.0 | 8.0 | 9.9 | | | 9.5 | 9.9 | 0.8 | 7.0 | 7.2 |
| CaO | 1.0 | 23.0 | 5.3 | | | 6.4 | 0.8 | 5.7 | 7.0 | 6.5 |
| SrO | | | 6.0 | | | 5.5 | | | 1.0 | 0.8 |
| BaO | 1.0 | | 2.5 | | | 3.0 | 2.1 | 0.5 | 14.3 | 15.2 |
| ZnO | | | 0.5 | | | 0.5 | | | 3.6 | 2.6 |
| MgO | | | | 0.4 | 0.4 | | | 2.8 | | |
| $Li_2O$ | | | | 4.0 | 3.9 | | | | | |
| $Na_2O$ | 6.0 | 0.3 | | 0.5 | 0.5 | | 5.9 | 16.0 | | |
| $K_2O$ | 2.0 | 0.1 | | 0.3 | 0.3 | | 2.5 | 1.4 | | |
| $P_2O_5$ | | | | | | | | 0.3 | | |
| $As_2O_3$ | | | | 0.5 | 0.5 | | | | 0.8 | 0.4 |
| $ZrO_2$ | | | 0.2 | 2.1 | 2.0 | 0.1 | | | | |
| $SnO_2$ | | | 0.02 | | | 0.01 | | | | |
| $TiO_2$ | | | | 2.0 | 1.9 | | 3.0 | | | |
| $Sb_2O_3$ | 0.1 | | 0.5 | 1.2 | 0.5 | 0.1 | | 0.2 | | |
| $Fe_2O_3$ | | | | | | | | 0.6 | | |
| (μL/g) | | | | | | | | | | |
| He | 0.386 | 0.435 | 0.170 | 0.551 | 0.480 | 0.386 | 0.211 | 0.353 | 0.180 | 0.143 |
| Ne | <0.001 | 0.028 | <0.001 | <0.001 | <0.001 | <0.001 | <0.001 | <0.001 | <0.001 | <0.001 |
| Number of bubbles (bubbles/10 g) | 1 | ND | 1 | 1 | 1 | ND | ND | ND | ND | 2 | invention according to claim 6; and sample No. 160 corresponds to the invention according to claim 12.

TABLE 16

| | Sample No. | | | | | | | | | |
|---|---|---|---|---|---|---|---|---|---|---|
| | 151 | 152 | 153 | 154 | 155 | 156 | 157 | 158 | 159 | 160 |
| (mass %) | | | | | | | | | | |
| $SiO_2$ | 68.2 | 35.5 | 75.5 | 63.9 | 70.9 | 68.7 | 60.4 | 26.0 | 33.4 | 48.3 |
| $Al_2O_3$ | 3.5 | 0.1 | 1.3 | 6.5 | 2.1 | 3.7 | 14.8 | | | |

TABLE 16-continued

| | Sample No. | | | | | | | | | |
|---|---|---|---|---|---|---|---|---|---|---|
| | 151 | 152 | 153 | 154 | 155 | 156 | 157 | 158 | 159 | 160 |
| $B_2O_3$ | 18.5 | | 16.3 | 21.0 | 0.9 | 1.0 | | 1.2 | 3.1 | |
| CaO | | | 0.4 | | | | 0.4 | | 0.5 | 0.1 |
| SrO | | | 0.7 | | 1.0 | 0.2 | | | | |
| BaO | | | | | 5.8 | 7.4 | | | 5.0 | |
| PbO | | 58.9 | | | | | | 71.7 | 55.0 | 37.0 |
| $Li_2O$ | 1.1 | | | | 2.8 | 1.1 | 1.0 | | | |
| $Na_2O$ | 0.4 | | 4.1 | 6.6 | 4.1 | 10.4 | 15.9 | | 0.5 | 8.0 |
| $K_2O$ | 8.3 | 5.1 | 1.6 | 1.5 | 9.4 | 4.2 | 2.4 | 0.5 | 2.0 | 6.0 |
| $As_2O_3$ | 0.1 | | | | | | | | | 0.4 |
| $ZrO_2$ | | | | | | | 5.0 | | | |
| F | | | | 0.5 | | 0.3 | | | | |
| Cl | | | 0.1 | | | | | | | |
| $Sb_2O_3$ | | 0.4 | | | | | | 0.6 | 0.5 | 0.2 |
| $Fe_2O_3$ | | | | | 3.0 | 3.0 | 0.1 | | | |
| (μL/g) | | | | | | | | | | |
| He | 0.241 | 0.189 | 0.170 | 0.222 | 0.527 | 0.250 | 0.221 | 0.356 | 0.180 | 0.111 |
| Ne | <0.001 | 0.020 | <0.001 | 0.015 | <0.001 | <0.001 | <0.001 | <0.001 | <0.001 | <0.001 |
| Number of bubbles (bubbles/10 g) | ND | ND | 1 | 1 | 1 | 1 | ND | ND | ND | 2 |

Samples No. 161 to No. 170 in Table 17 correspond to the inventions according to claims 1 to 3. Further, samples No. 161 to No. 162, No. 164 to No. 166, and No. 169 to No. 170 correspond to the invention according to claim 4; samples No. 162 and No. 166 correspond to the invention according to claim 9; samples No. 161, No. 164 to No. 165, and No. 169 to No. 170 correspond to the invention according to claim 8; samples No. 163 and No. 167 to No. 168 correspond to the invention according to claim 5; and samples No. 163 to No. 164 and No. 167 to No. 168 correspond to the invention according to claim 6. Further, samples No. 161, No. 164 to No. 165, and No. 169 to No. 170 correspond to the invention according to claim 10; samples No. 163 and No. 167 to No. 168 correspond to the invention according to claim 11; and samples No. 162 and No. 166 correspond to the invention according to claim 12.

Comparative Example 4

Samples No. 171 to No. 180 in Table 18 and samples No. 181 to No. 190 in Table 19 represent glass compositions according to Comparative Example 4 of the present invention. Molten glass were prepared in the same manner as in Example 4 of Table 16, and samples No. 171 to No. 180 in Comparative Example 4 were produced by remelting in the same manner as in Example 4 except that the melting atmosphere was changed to an atmospheric condition. Molten glass were prepared in the same manner as in Example 4 of Table 17, and samples No. 181 to No. 190 in Comparative Example 4 were produced by remelting in the same manner as in Example 4 except that the melting atmosphere was changed to an atmospheric condition. After cooling, analysis after remelting confirmed that oxide compositions were the

TABLE 17

| | Sample No. | | | | | | | | | |
|---|---|---|---|---|---|---|---|---|---|---|
| | 161 | 162 | 163 | 164 | 165 | 166 | 167 | 168 | 169 | 170 |
| (mass %) | | | | | | | | | | |
| $SiO_2$ | 59.8 | 59.9 | 59.7 | 59.3 | 59.5 | 59.8 | 58.9 | 59.4 | 58.2 | 60.0 |
| $Al_2O_3$ | 14.9 | 15.1 | 15.5 | 14.9 | 14.9 | 14.8 | 15.1 | 14.8 | 15.1 | 14.9 |
| $B_2O_3$ | 9.9 | 9.7 | 9.4 | 9.7 | 9.9 | 9.9 | 9.8 | 9.9 | 9.9 | 9.7 |
| CaO | 5.3 | 5.4 | 5.2 | 5.0 | 5.1 | 5.3 | 5.3 | 5.3 | 5.3 | 5.2 |
| SrO | 6.0 | 5.7 | 5.9 | 5.8 | 6.0 | 6.0 | 5.9 | 5.8 | 5.5 | 5.2 |
| BaO | 2.5 | 2.5 | 2.3 | 2.4 | 2.5 | 2.5 | 2.4 | 2.5 | 2.5 | 2.4 |
| PbO | 0.5 | 0.5 | 0.4 | 0.5 | 0.5 | 0.5 | 0.5 | 0.5 | 0.3 | 0.4 |
| $ZrO_2$ | 0.2 | 0.2 | 0.2 | 0.2 | 0.2 | 0.2 | 0.2 | 0.2 | 0.2 | 0.2 |
| $Sb_2O_3$ | 1.0 | 0.3 | | 1.0 | 0.8 | 0.5 | | | 1.3 | 0.9 |
| $As_2O_3$ | | 0.7 | | | | 0.5 | | | | |
| $SnO_2$ | 0.2 | | | 0.2 | 0.6 | | | | 1.7 | 1.1 |
| $SO_3$ | | | 0.4 | | | | 0.7 | 0.8 | | |
| Cl | | | 1.0 | 1.0 | | | 1.2 | 0.8 | | |
| (μL/g) | | | | | | | | | | |
| He | 0.843 | 0.952 | 0.581 | 0.630 | 0.153 | 0.443 | 0.543 | 0.391 | 0.567 | 0.455 |
| Ne | <0.001 | <0.001 | <0.001 | <0.001 | <0.001 | <0.001 | <0.001 | <0.001 | <0.001 | <0.001 |
| Number of bubbles (bubbles/10 g) | ND | ND | 10 | 2 | ND | 6 | 3 | 1 | 2 | 1 | same as those before melting. The number of bubbles remaining in the glass was determined using a stereoscopic microscope of 20 to 100 power magnification while keeping the glass in an immersion liquid having the same refractive index as the glass.

TABLE 18

| | Sample No. | | | | | | | | | |
|---|---|---|---|---|---|---|---|---|---|---|
| | 171 | 172 | 173 | 174 | 175 | 176 | 177 | 178 | 179 | 180 |
| (mass %) | | | | | | | | | | |
| $SiO_2$ | 68.0 | 35.3 | 75.0 | 63.7 | 70.9 | 68.7 | 60.4 | 26.0 | 33.4 | 48.3 |
| $Al_2O_3$ | 3.5 | 0.1 | 1.3 | 6.5 | 2.1 | 3.7 | 0.3 | | | |
| $B_2O_3$ | 18.6 | | 16.5 | 21.2 | 0.9 | 1.0 | | 1.2 | 3.1 | |
| CaO | | | 0.5 | | | | 0.4 | | 0.5 | 0.1 |
| SrO | | | 0.7 | | 1.0 | 0.2 | | | | |
| BaO | | | | | 5.8 | 7.4 | | | 5.0 | |
| PbO | | 59.1 | | | | | | 71.7 | 55.0 | 37.0 |
| $Li_2O$ | 1.2 | | | | 2.8 | 1.1 | 1.0 | | | |
| $Na_2O$ | 0.4 | | 4.2 | 6.6 | 4.1 | 10.4 | 15.9 | | 0.5 | 8.0 |
| $K_2O$ | 8.3 | 5.1 | 1.7 | 1.5 | 9.4 | 4.2 | 2.4 | 0.5 | 2.0 | 6.0 |
| $As_2O_3$ | 0.1 | | | | | | | | | 0.4 |
| $ZrO_2$ | | | | | | | 19.5 | | | |
| F | | | | 0.5 | | 0.3 | | | | |
| Cl | | | 0.1 | | | | | | | |
| $Sb_2O_3$ | | 0.4 | | | | | | 0.6 | 0.5 | 0.2 |
| $Fe_2O_3$ | | | | | 3.0 | 3.0 | 0.1 | | | |
| (μL/g) | | | | | | | | | | |
| He | <0.001 | <0.001 | <0.001 | <0.001 | <0.001 | <0.001 | <0.001 | <0.001 | <0.001 | <0.001 |
| Ne | <0.001 | <0.001 | <0.001 | <0.001 | <0.001 | <0.001 | <0.001 | <0.001 | <0.001 | <0.001 |
| Number of bubbles (bubbles/10 g) | 280 | 690 | 1,240 | 750 | 670 | 420 | 1,020 | 1,640 | 1,630 | 1,010 |

TABLE 19

| | Sample No. | | | | | | | | | |
|---|---|---|---|---|---|---|---|---|---|---|
| | 181 | 182 | 183 | 184 | 185 | 186 | 187 | 188 | 189 | 190 |
| (mass %) | | | | | | | | | | |
| $SiO_2$ | 59.8 | 59.9 | 59.7 | 59.3 | 59.5 | 59.8 | 58.9 | 59.4 | 58.2 | 60.0 |
| $Al_2O_3$ | 14.9 | 15.1 | 15.5 | 14.9 | 14.9 | 14.8 | 15.1 | 14.8 | 15.1 | 14.9 |
| $B_2O_3$ | 9.9 | 9.7 | 9.4 | 9.7 | 9.9 | 9.9 | 9.8 | 9.9 | 9.9 | 9.7 |
| CaO | 5.3 | 5.4 | 5.2 | 5.0 | 5.1 | 5.3 | 5.3 | 5.3 | 5.3 | 5.2 |
| SrO | 6.0 | 5.7 | 5.9 | 5.8 | 6.0 | 6.0 | 5.9 | 5.8 | 5.5 | 5.2 |
| BaO | 2.5 | 2.5 | 2.3 | 2.4 | 2.5 | 2.5 | 2.4 | 2.5 | 2.5 | 2.4 |
| PbO | 0.5 | 0.5 | 0.4 | 0.5 | 0.5 | 0.5 | 0.5 | 0.5 | 0.3 | 0.4 |
| $ZrO_2$ | 0.2 | 0.2 | 0.2 | 0.2 | 0.2 | 0.2 | 0.2 | 0.2 | 0.2 | 0.2 |
| $Sb_2O_3$ | 1.0 | 0.3 | | 1.0 | 0.8 | 0.5 | | | 1.3 | 0.9 |
| $As_2O_3$ | | 0.7 | | | | 0.5 | | | | |
| $SnO_2$ | 0.2 | | | 0.2 | 0.6 | | | | 1.7 | 1.1 |
| $So_3$ | | | 0.4 | | | | 0.7 | 0.8 | | |
| Cl | | | 1.0 | 1.0 | | | 1.2 | 0.8 | | |
| (μL/g) | | | | | | | | | | |
| He | <0.001 | <0.001 | <0.001 | <0.001 | <0.001 | <0.001 | <0.001 | <0.001 | <0.001 | <0.001 |
| Ne | <0.001 | <0.001 | <0.001 | <0.001 | <0.001 | <0.001 | <0.001 | <0.001 | <0.001 | <0.001 |
| Number of bubbles (bubbles/10 g) | 810 | 110 | 1,630 | 750 | 6,230 | 5,830 | 480 | 280 | 160 | 4,830 |

The results of direct melting the raw materials confirmed that the samples in Example 4 containing He and Ne had no bubbles or, if any, about 1 to 2 bubbles/10 g after cooling. On the other hand, the samples in Comparative Example 4 without He and Ne had about 110 to 6,230 bubbles/10 g, which is an apparently larger number than that in Example 4. That is, the number of bubbles is reduced by including He and Ne in the glass composition.

Example 5

Glass raw materials were prepared to yield a glass composition shown in Table 20. Then, 500 g of the glass raw materials was charged into a platinum-rhodium (15%) crucible for glass melting. The crucible was placed in an indirect electric resistance furnace for melting at 1,500° C. for 3 hours. A He gas (99.9999% purity) was introduced into the furnace through a supply port connected to the inside of the electric resistance furnace during melting. Melting was conducted while confirming complete replacement of the furnace atmosphere with He from analysis results of $N_2$, $CO_2$, CO, Ar, and $O_2$ in exhaust. After melting for a predetermined period of time, the molten glass was cast in a carbon mold, and cooled in a slow cooling furnace. Then, an amount required for analysis was sampled. A Pt (platinum) content in the molded glass was analyzed using an ICP mass spectrometer similar to the above-described analyzer (7000S, manufactured by Agilent Technologies, Inc.). The results show that the glass contains 3.1 ppm of platinum eluted from an inner wall of the crucible used for melting.

TABLE 20

| | Sample No. 191 |
|---|---|
| (mass %) | |
| $SiO_2$ | 63.2 |
| $Al_2O_3$ | 2.0 |
| SrO | 9.1 |
| BaO | 8.9 |
| $Na_2O$ | 7.6 |
| $K_2O$ | 7.7 |
| $ZrO_2$ | 1.5 |

Comparative Example 5

The same glass raw materials as those of Example 5 were melted in two melting atmospheres (atmospheric condition and $N_2$ (nitrogen atmosphere)) at 1,500° C. for 3 hours using the same apparatus as in Example 5. A $N_2$ (nitrogen) gas, similar to He, was supplied through a supply port connected to the inside of the electric resistance furnace. A Pt (platinum) content in the molded glass was analyzed in the same manner as in Example 5 using an ICP mass spectrometer. The results show the Pt content of 4.1 ppm in the glass produced by melting in a $N_2$ atmosphere, and the Pt content of 5.1 ppm in the glass produced by melting in an atmospheric condition, both indicating large amounts of Pt melted in the glass.

As described above, glass melting in a He atmosphere enables reduction of an amount of Pt melting into the molten glass and suppresses the Pt content in the glass product even when glass is melted in an environment containing platinum, to thereby provide homogeneous glass product.

Example 6

A discharge rate of a gas discharged from the molten glass by introduction of a He gas was studied, to investigate how He functions in the molten glass.

Table 21 shows a glass composition used for the investigation. 1 g of glass melted and analyzed for its composition in advance was held in a platinum boat, and the boat was placed inside an electric furnace of an airtight structure. The boat was heated in an environment of nitrogen and He introduced as carrier gases, and the discharge rate of the gas discharged was measured. The discharge rate of the gas discharged was measured using a quadrupole mass spectrometer. Table 22 shows the results.

TABLE 21

| | Sample No. | |
|---|---|---|
| | 192 | 193 |
| (mass %) | | |
| $SiO_2$ | 63.0 | 58.9 |
| $Al_2O_3$ | 2.0 | 14.1 |
| $B_2O_3$ | — | 9.8 |
| CaO | — | 5.2 |
| SrO | 9.1 | 5.9 |
| BaO | 8.9 | 2.4 |
| ZnO | — | 0.5 |
| $Na_2O$ | 7.6 | — |
| $K_2O$ | 7.7 | — |
| $ZrO_2$ | 1.5 | 0.2 |
| $SO_3$ | 0.2 | — |
| $Sb_2O_3$ | — | 1.0 |
| $As_2O_3$ | — | 1.0 |
| $SnO_2$ | — | 1.0 |

TABLE 22

| Sample No. | Measurement gas species | Measurement temperature | Gas discharge rate (µL/g · sec) at 0° C., 1 atm | |
|---|---|---|---|---|
| | | | $N_2$ carrier gas | He carrier gas |
| 192 | $SO_2$ | 1550 | 0.01 | 0.10 |
| 193 | $O_2$ | 1300 | 0.03 | 0.70 |
| | $O_2$ | 1400 | 0.04 | 0.70 |
| | $O_2$ | 1600 | 0.02 | 0.80 |

Samples No. 192 and No. 193 have different compositions and use different fining agents. Table 22 clearly shows that the discharge rates of the gas discharged from both samples by the introduction of the He gas as a carrier gas are about 10 times the discharge rates of the gas discharged by $N_2$ introduction and are independent of temperature. The gas discharge rate is in direct proportion with an inner partial pressure of the gas in the molten glass. A large inner partial pressure of the molten glass can be indirectly grasped through He introduction.

The glass composition according to the present invention is manufactured by melting the glass raw materials, contains a plurality of oxides as main components, and contains a predetermined amount of helium and/or neon in the molten glass. Thus, bubbles hardly remain in the glass as defects, and the glass composition is highly homogeneous. Therefore, prosperity can be further promoted in a variety of industries employing diverse glass products.

Further, the inclusion of the fining component enables assured clarifying of the glass during melting while imparting properties of inhibiting reboiling by heat treatment or the like to the glass product. Therefore, further exploitation of applications can be promoted in industrial fields employing the glass products.

The invention claimed is:

1. A glass composition manufactured by melting glass raw materials and containing a plurality of oxides as a main component, characterized by comprising at least one of helium and neon in an amount of 0.01 to 2 µL/g (0° C., 1 atm).

2. A glass composition according to claim 1, characterized by comprising a fining component in an amount of 0.001 to 3 mass %.

3. A glass composition according to claim 1, characterized by comprising one or more fining components selected from the group consisting of $SO_3$, Cl, $H_2O$, Sn, Sb, F, and As.

4. A glass composition according to claim 1, characterized by comprising Sb in an amount of 0.01 to 1.5 mass % as $Sb_2O_3$.

5. A glass composition according to claim 1, characterized by comprising $SO_3$ in an amount of 0.001 to 1.0 mass %.

6. A glass composition according to claim 1, characterized by comprising Cl in an amount of 0.01 to 1.5 mass %.

7. A glass composition according to claim 1, characterized by comprising $H_2O$ in an amount of 0.01 to 0.2 mass %.

8. A glass composition according to claim 1, characterized by comprising Sn in an amount of 5 ppm mass to 2 mass % as $SnO_2$.

9. A glass composition according to claim 1, characterized by comprising As in an amount of 0.01 to 1.5 mass % as $As_2O_3$.

10. A glass composition according to claim 1, characterized by comprising Sb in an amount of 0.01 to 1.5 mass % as $Sb_2O_3$, and Sn in an amount of 5 mass ppm to 2 mass % as $SnO_2$.

11. A glass composition according to claim 1, characterized by comprising $SO_3$ in an amount of 0.001 to 1.0 mass %, and Cl in an amount of 0.01 to 1.5 mass %.

12. A glass composition according to claim 1, characterized by comprising Sb in an amount of 0.01 to 1.5 mass % as $Sb_2O_3$, and As in an amount of 0.01 to 1.5 mass % as $AS_2O_3$.

* * * * *

UNITED STATES PATENT AND TRADEMARK OFFICE
CERTIFICATE OF CORRECTION

PATENT NO. : 7,538,050 B2  Page 1 of 1
APPLICATION NO. : 10/503546
DATED : May 26, 2009
INVENTOR(S) : Masataka Takagi et al.

It is certified that error appears in the above-identified patent and that said Letters Patent is hereby corrected as shown below:

On the Title page of the patent grant, please replace item (22) PCT Filed Date from "February 05, 2002" to --February 05, 2003--

Signed and Sealed this

Thirteenth Day of October, 2009

David J. Kappos
*Director of the United States Patent and Trademark Office*